(12) United States Patent
Matsushima

(10) Patent No.: US 7,620,700 B2
(45) Date of Patent: Nov. 17, 2009

(54) COMMUNICATION SYSTEM IMPLEMENTING A PLURALITY OF COMMUNICATION APPARATUSES AS COMMUNICATION CLIENT AND COMMUNICATION SERVER FOR EXCHANGING OPERATION REQUESTS AND OPERATION RESPONSES

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 673 days.

(21) Appl. No.: 10/665,745

(22) Filed: Sep. 22, 2003

(65) Prior Publication Data

US 2004/0148328 A1    Jul. 29, 2004

(30) Foreign Application Priority Data

| Sep. 19, 2002 | (JP) | 2002-272978 |
| Sep. 24, 2002 | (JP) | 2002-276451 |
| Aug. 28, 2003 | (JP) | 2003-305506 |
| Aug. 28, 2003 | (JP) | 2003-305511 |
| Aug. 28, 2003 | (JP) | 2003-305513 |
| Aug. 28, 2003 | (JP) | 2003-305514 |
| Aug. 28, 2003 | (JP) | 2003-305517 |

(51) Int. Cl.
*G06F 15/16* (2006.01)

(52) U.S. Cl. ...................... 709/219
(58) Field of Classification Search ............. 709/236, 709/237, 217, 203, 219; 717/173, 178
See application file for complete search history.

(56) References Cited

U.S. PATENT DOCUMENTS 4,870,704 A * 9/1989 Matelan et al. ............. 710/120
6,108,715 A * 8/2000 Leach et al. ................ 719/330

(Continued)

FOREIGN PATENT DOCUMENTS

JP    1-259645    10/1989

(Continued)

OTHER PUBLICATIONS

Simple Object Access Protocol (SOAP 1.1) p. 5. Box et al Aug. 2, 2001. http://web.archive.org/web/20010801160139/www.w3.org/TR/SOAP/.*

(Continued)

*Primary Examiner*—J Bret Dennison
(74) *Attorney, Agent, or Firm*—Oblon, Spivak, McClelland, Maier & Neustadt, L.L.P.

(57) ABSTRACT

A communication technique is provided for realizing transmission/reception of an operation request and an operation response to a received operation response performed between a plurality of communication apparatuses that are arranged to either transmit a communication request and receive a communication response to this communication request or receive a communication request and transmit a communication response to this communication request. The communication apparatus may correspond to an HTTP client that collectively sends to an HTTP server a client command that is to be sent to the HTTP server and a response to a server command that has been received from the HTTP server in one batch as an HTTP request, or the communication apparatus may correspond to the HTTP server that collectively sends a server command that is to be sent to the HTTP client and a response to a client command that has been received from the HTTP client in one batch as an HTTP response.

6 Claims, 31 Drawing Sheets

U.S. PATENT DOCUMENTS

| | | | |
|---|---|---|---|
| 6,182,220 B1* | 1/2001 | Chen et al. | 713/182 |
| 6,184,996 B1* | 2/2001 | Gase | 358/1.15 |
| 6,249,800 B1* | 6/2001 | Aman et al. | 718/105 |
| 6,349,336 B1 | 2/2002 | Sit et al. | |
| 6,553,422 B1 | 4/2003 | Nelson | |
| 6,698,950 B2 | 3/2004 | Nishii | |
| 7,149,813 B2* | 12/2006 | Flanagin et al. | 709/248 |
| 7,207,039 B2* | 4/2007 | Komarla et al. | 717/178 |
| 2002/0046239 A1* | 4/2002 | Stawikowski et al. | 709/203 |
| 2002/0091755 A1* | 7/2002 | Narin | 709/203 |
| 2002/0174178 A1 | 11/2002 | Stawikowski | |
| 2003/0125063 A1* | 7/2003 | Svensson et al. | 455/517 |
| 2004/0003057 A1* | 1/2004 | Broad et al. | 709/219 |
| 2005/0055517 A1* | 3/2005 | Olds et al. | 711/158 |
| 2007/0016639 A1* | 1/2007 | Mukundan et al. | 709/203 |
| 2008/0039066 A1* | 2/2008 | Laroia et al. | 455/422.1 |

FOREIGN PATENT DOCUMENTS

| | | |
|---|---|---|
| JP | 4-68897 | 3/1992 |
| JP | 06-75890 | 3/1994 |
| JP | 2000-216794 | 8/2000 |
| JP | 2000-324157US | 11/2000 |
| JP | 2000-341326 | 12/2000 |
| JP | 2001-273211 | 10/2001 |
| JP | 2002-2066 | 1/2002 |
| JP | 2002-135858 | 5/2002 |
| JP | 2002-223211 | 8/2002 |

OTHER PUBLICATIONS

Simple Object Access Protocol (SOAP 1.1) http://web.archive.org/web/20010801160139/www.w3.org/TR/SOAP/ p. 5, Box et al.*
U.S. Appl. No. 09/753,582, filed Jan. 4, 2001, Matsushima.
U.S. Appl. No. 09/985,367, filed Nov. 2, 2001, Matsushima.
U.S. Appl. No. 09/985,484, filed Nov. 5, 2001, Matsushima.
U.S. Appl. No. 10/025,758, filed Dec. 26, 2001, Matsushima.
U.S. Appl. No. 10/938,563, filed Sep. 13, 2004, Matsushima.
U.S. Appl. No. 11/400,227, filed Apr. 10, 2006, Matsushima.
U.S. Appl. No. 12/051,226, filed Mar. 19, 2008, Matsushima.
Yokohama Bay kit MICCI, Java Network Programming (Protocol Version), Chapter 6, "Future Possibilities of Networks enabled by SOAP", Software Design No. 140, Gijutsu-Hyoron Co., Ltd., Jun. 18, 2002, pp. 64-71 (w/partial English Translation).

* cited by examiner

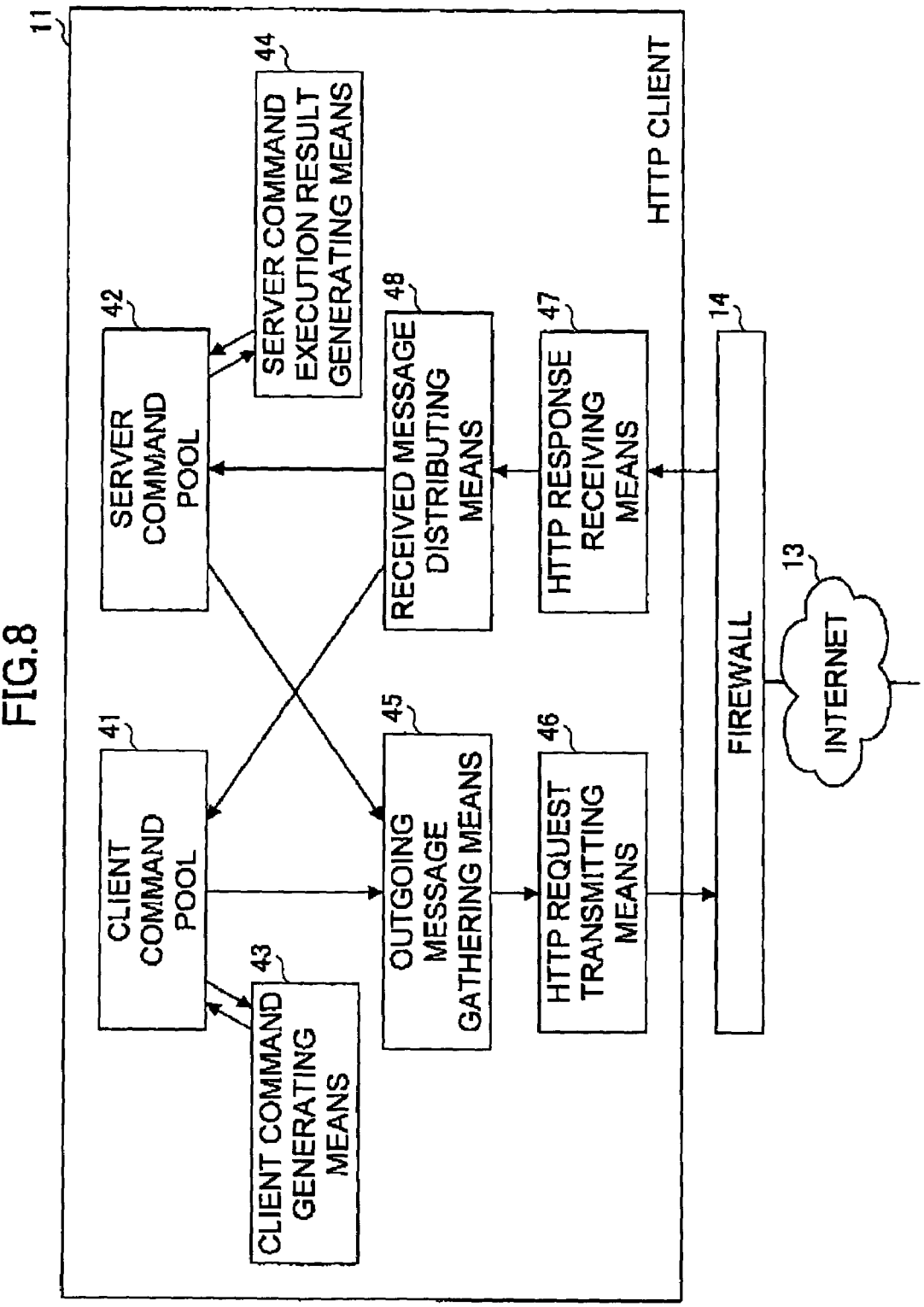

FIG.9

CLIENT COMMAND SHEET IN
HTTP CLIENT

COMMAND ID

METHOD NAME (e.g., TROUBLE NOTIFICATION)

INPUT PARAMETER (e.g., TROUBLE CONTENT)

STATUS (INITIAL VALUE: NOT SENT)

CLIENT COMMAND EXECUTION
RESULT NOTIFYING DESTINATION

OUTPUT PARAMETER
(BLANK UNTIL RESPONSE IS ACQUIRED)

FIG.10

SERVER COMMAND SHEET IN
HTTP CLIENT

COMMAND ID

METHOD NAME (e.g., COUNTER ACQUISITION)

INPUT PARAMETER

STATUS (INITIAL VALUE: NOT SENT)

OUTPUT PARAMETER
(BLANK UNTIL PROCESS IS COMPLETED)

SERVER COMMAND NOTIFYING DESTINATION

FIG.11

HTTP REQUEST

```
POST /aaa HTTP/1.1
Content-Type:multipart/mixed;boundary=MIME_boundary
Content-Length:nnnn --MIME_boundary
Content-Type:text/xml;charset=UTF-8
Content-Transfer-Encoding:8bit
SOAPAction:"SOAP Action URI"
X-SOAP-Type:Requset <s:Envelope>
   <--SOAP Request-->
</s:Envelope>
```
⎫
⎬  PART 1
⎭

```
--MIME_boundary
Content-Type:text/xml;charset=UTF-8
Content-Transfer-Encoding:8bit
X-SOAP-Type:Response <s:Envelope>
   <--SOAP Response-->
</s:Envelope>
```
⎫
⎬  PART 2
⎭

```
--MIME_boundary
Content-Type:text/xml;charset=UTF-8
Content-Transfer-Encoding:8bit
X-SOAP-Type:Response <s:Envelope>
   <--SOAP Response-->
</s:Envelope>
```
⎫
⎬  PART 3
⎭

```
--MIME_boundary
Content-Type:text/xml;charset=UTF-8
Content-Transfer-Encoding:8bit
X-SOAP-Type:Response <s:Envelope>
   <--SOAP Response-->
</s:Envelope>

--MINE_boundary--
```
⎫
⎬  PART 4
⎭

FIG.12

HTTP RESPONSE

```
HTTP/1.1  200  OK
Content-Type:multipart/mixed;boundary=MIME_boundary
Content-Length:nnnn --MIME_boundary
Content-Type:text/xml;charset=UTF-8
Content-Transfer-Encoding:8bit
SOAPAction:"SOAP Action URI"
X-SOAP-Type:Requset <s:Envelope>
    <--SOAP Request-->
</s:Envelope>
```
} PART 1

```
--MIME_boundary
Content-Type:text/xml;charset=UTF-8
Content-Transfer-Encoding:8bit
X-SOAP-Type:Response <s:Envelope>
    <--SOAP Response-->
</s:Envelope>
```
} PART 2

```
--MIME_boundary
Content-Type:text/xml;charset=UTF-8
Content-Transfer-Encoding:8bit
X-SOAP-Type:Response <s:Envelope>
    <--SOAP Response-->
</s:Envelope>
```
} PART 3

```
--MIME_boundary
Content-Type:text/xml;charset=UTF-8
Content-Transfer-Encoding:8bit
X-SOAP-Type:Response <s:Envelope>
    <--SOAP Response-->
</s:Envelope>

--MINE_boundary--
```
} PART 4

FIG.13

EXEMPLARY PART DESCRIBING CLIENT COMMAND

```
Content-Type: text/xml; charset=UTF-8
Content-Transfer-Encoding: 8bit
X-SOAP-Type : Request
SOAPAction: "http://www.foo.com/ server/ errorNotification"

<s:Envelope
  xmlns:s="http://schemas.xmlsoap.org/soap/envelope/"
  xmlns:se="http://schemas.xmlsoap.org/soap/encoding/"
  xmlns:n="http://www.foo.com/header"
  xmlns:ns="http://www.foo.com/server"
  s:encodingStyle="http://schemas.xmlsoap.org/soap/encoding">

<s:Header>
     <n:Request ID> 12345 </n:Request ID>
  </s:Header>
  <s:Body>
    <ns:Trouble Notification>
       <ErrorID> 1111 </ErrorID>
       <Description>Hard Disk Drive Trouble </Description>
    </ns:Trouble Notification>
  </s:Body>
</s:Envelope>
```

FIG.14

EXEMPLARY PART DESCRIBING RESPONSE TO CLIENT COMMAND

```
Content-Type: text/xml; charset=UTF-8
Content-Transfer-Encoding: 8bit
X-SOAP-Type : Response <s:Envelope
   xmlns:s="http://schemas.xmlsoap.org/soap/envelope/"
   xmlns:se="http://schemas.xmlsoap.org/soap/encoding/"
   xmlns:n="http://www.foo.com/header"
   xmlns:ns="http://www.foo.com/server"
   s:encodingStyle="http://schemas.xmlsoap.org/soap/encoding">

<s:Header>
     <n:Request ID> 12345 </n:Request ID>
  </s:Header>
   <s:Body>
     <ns:Trouble Notification Response>
        <Reception Result> OK </Reception Result>
     </ns:Trouble Notification Response>
   </s:Body>
</s:Envelope>
```

FIG.15

EXEMPLARY PART
DESCRIBING SERVER COMMAND

```
Content-Type: text/xml; charset=UTF-8
Content-Transfer-Encoding: 8bit
X-SOAP-Type : Request
SOAPAction: "http://www.foo.com/ client/getTemperature"

<s:Envelope
  xmlns:s="http://schemas.xmlsoap.org/soap/envelope/"
  xmlns:se="http://schemas.xmlsoap.org/soap/encoding/"
  xmlns:n="http://www.foo.com/header"
  xmlns:nc="http://www.foo.com/client"
  s:encodingStyle="http://schemas.xmlsoap.org/soap/encoding">

<s:Header>
     <n:Request ID> 98765 </n:Request ID>
  </s:Header>
   <s:Body>
     <nc:Temperature Sensor Value Acqisition>
        <SensorID> 3 </SensorID>
     </nc:Temperature Sensor>
   </s:Body>
</s:Envelope>
```

FIG.16

EXEMPLARY PART DESCRIBING RESPONSE TO SERVER COMMAND

```
Content-Type: text/xml; charset=UTF-8
Content-Transfer-Encoding: 8bit
X-SOAP-Type : Response <s:Envelope
  xmlns:s="http://schemas.xmlsoap.org/soap/envelope/"
  xmlns:se="http://schemas.xmlsoap.org/soap/encoding/"
  xmlns:n="http://www.foo.com/header"
  xmlns:nc="http://www.foo.com/client"
  s:encodingStyle="http://schemas.xmlsoap.org/soap/encoding">

<s:Header>
     <n:Request ID> 98765 </n:Request ID>
  </s:Header>
   <s:Body>
      <nc:Temperature Sensor Value Acqisition Response>
         <Temperature> 52 </Temperature>
      </nc:Temperature Sensor Value Acqisition Response>
   </s:Body>
</s:Envelope>
```

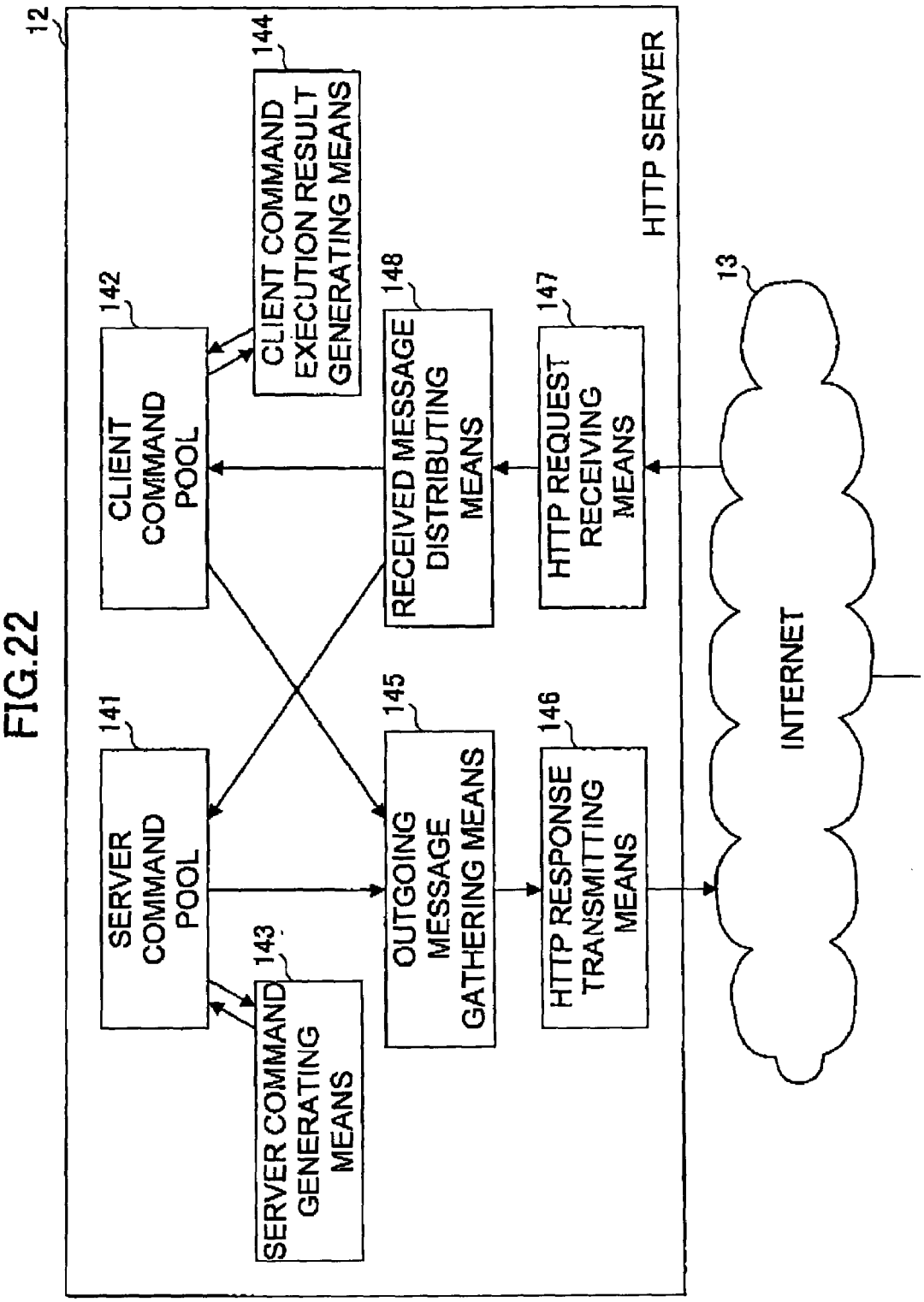

FIG.23

SERVER COMMAND SHEET IN
HTTP SERVER

COMMAND ID

METHOD NAME (e.g., TROUBLE NOTIFICATION)

INPUT PARAMETER (e.g., TROUBLE CONTENT)

STATUS (INITIAL VALUE: NOT PROCESSED)

SERVER COMMAND EXECUTION
RESULT NOTIFYING DESTINATION

OUTPUT PARAMETER
(BLANK UNTIL RESPONSE IS ACQUIRED)

FIG.24

CLIENT COMMAND SHEET IN
HTTP SERVER

COMMAND ID

METHOD NAME (e.g., COUNTER ACQUISITION)

INPUT PARAMETER

STATUS (INITIAL VALUE: NOT PROCESSED)

OUTPUT PARAMETER
(BLANK UNTIL PROCESS IS COMPLETED)

CLIENT COMMAND NOTIFYING DESTINATION

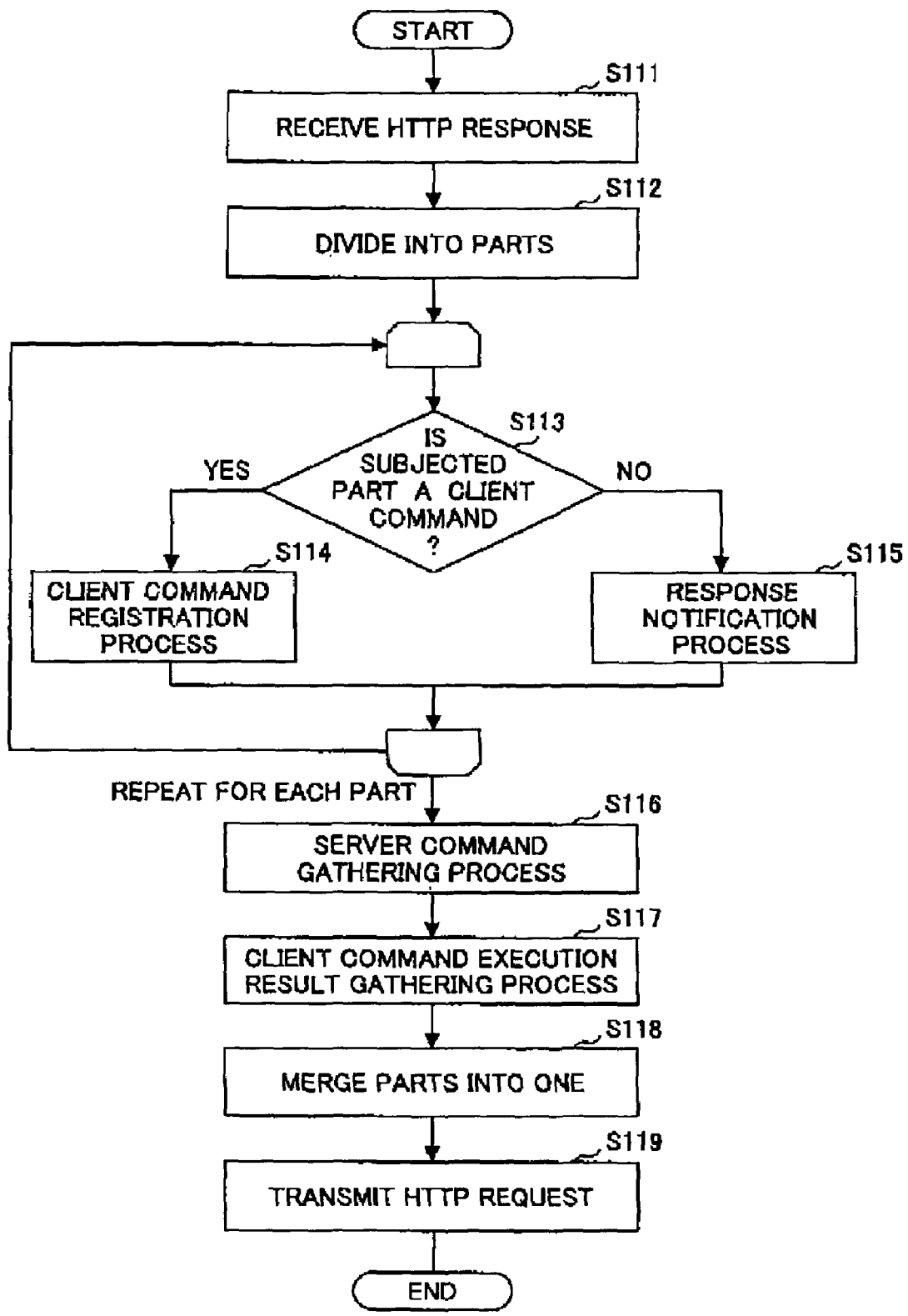

FIG.34

```
From: deviceA@foo.com
To: deviceB@bar.com
Subject: Multi Message #0000001
Date: Web, 30 Jul 2003 10:00:00 +0900
Content-Type:multipart/mixed;boundary=MIME_boundary
Content-Length:nnnn --MIME_boundary
Content-Type:text/xml;charset=iso-2022-jp
Content-Transfer-Encoding:7bit
SOAPAction:"SOAP Action URI"
X-SOAP-Type:Requset <s:Envelope>
   <--SOAP Request-->
</s:Envelope>
```
} PART 1

```
--MIME_boundary
Content-Type:text/xml;charset=iso-2022-jp
Content-Transfer-Encoding:7bit
X-SOAP-Type:Response <s:Envelope>
   <--SOAP Response-->
</s:Envelope>
```
} PART 2

```
--MIME_boundary
Content-Type:text/xml;charset=iso-2022-jp
Content-Transfer-Encoding:7bit
X-SOAP-Type:Response <s:Envelope>
   <--SOAP Response-->
</s:Envelope>
```
} PART 3

```
--MIME_boundary
Content-Type:text/xml;charset=iso-2022-jp
Content-Transfer-Encoding:7bit
X-SOAP-Type:Response <s:Envelope>
   <--SOAP Response-->
</s:Envelope>

--MINE_boundary--
```
} PART 4

COMMUNICATION SYSTEM IMPLEMENTING A PLURALITY OF COMMUNICATION APPARATUSES AS COMMUNICATION CLIENT AND COMMUNICATION SERVER FOR EXCHANGING OPERATION REQUESTS AND OPERATION RESPONSES

BACKGROUND OF THE INVENTION

1. Field of the Invention

The present invention relates to a communication technique in a communication system implementing a plurality of communication apparatuses for realizing between the communication apparatuses transmission/reception of an operation request and transmission/reception of an operation response to an operation request received from the communication counterpart.

2. Description of the Related Art

It is known that in a communication system connecting a plurality of communication apparatuses via a network, the communication apparatuses exchange messages with each other so that a communication apparatus is able to send a notification to a counterpart communication apparatus or command the counterpart apparatus to execute a request, for example. In such a system, a communication apparatus may send a command to execute an operation to another communication apparatus as an operation request and the communication apparatus receiving the operation request may send an execution result of the operation as an operation response.

Also, a technique is known in which a portion of the communication apparatuses making up the communication system are arranged to be communication clients and another portion of the communication apparatuses are arranged to be communication servers, and communication between a communication client and a communication server is realized by a protocol in which the communication client sends a communication request to the communication server and the communication server sends back a communication response to the communication client corresponding to a sender of the communication request.

In such a system, the communication client may describe an operation request in the communication request and send this to the communication server, and the communication server may describe the operation response to this operation request in the communication response and send this back to the communication client corresponding to the sender of the communication request.

Further, a reversal of the above technique is known in which the communication server sends an operation request to the communication client to administer the execution of an operation. In the following, exemplary implementations of such technology are described.

In Japanese Patent Laid Open Publication No.2001-273211, a message transmission/reception technique between a remote processor and a local processor is disclosed in which the remote processor sends a message indicating a command that is to be executed by the local processor and receives a response to the command from the local processor.

Also, according to this document, in a case where the local processor is stationed within a firewall, the local processor sends a communication request to the remote processor stationed outside the firewall so that a command can be sent to the local processor within the firewall from outside.

In this example, the local processor corresponds to the communication client and the remote processor corresponds to the communication server.

Also, the technology relating to the operation request can be used in a system for controlling the operation of an apparatus connected to the communication apparatus at a remote location. An example of such implementation is disclosed in Japanese Patent Laid Open Publication No.2002-135858. According to this document, in a remote operation system for operating blinds and lights, a remote operation apparatus having the function of accepting operations made by a user sends a command to a remotely controlled apparatus having the function of operating the blinds and lights. However, in this document, no mention is made of sending a response to the command.

In a case where messages are exchanged between a plurality of communication apparatuses, one of the communication apparatuses may correspond to the sender of commands. Alternatively, a plurality of communication apparatuses may be arranged to send commands to each other, in which case the communication apparatus receiving a command is arranged to send back an execution result to the sender of the command. In such an arrangement, information sent from one communication apparatus to a counterpart communication apparatus may be a command to the counterpart communication apparatus or an execution result of a command received from the counterpart communication apparatus.

In the conventional art, these commands and execution results are sent separately. In such a method, separate connections are respectively established for the time a command is to be sent and for the time an execution result of the received command is to be sent. In turn, the communication overhead is increased and thereby a problem in communication efficiency arises.

Presently, there are still many environments implementing the dial-up connection for establishing connection within a network. The above-described problem is particularly troublesome in such environments. Namely, in such environments, it may take several tens of seconds to establish a connection, and a fee is charged each time a connection is established. Therefore, an increase in the number of connections established results in a significant rise in costs.

SUMMARY OF THE INVENTION

The present invention has been conceived in order to resolve one or more of the above-described problems of the related art and its object is to improve communication efficiency for the transmission/reception of an operation request and an operation response to this operation request between a plurality of communication apparatuses.

Specifically, according to one aspect, a communication method of the present invention includes the steps of:

collectively transmitting from a first communication apparatus to a second communication apparatus an operation request to be transmitted to the second communication apparatus and an operation response to an operation request received from the second communication apparatus that are combined in one batch;

collectively transmitting from the second communication apparatus to the first communication apparatus an operation request to be transmitted to the first communication apparatus and an operation response to an operation request received from the first communication apparatus that are combined in one batch.

Further, in a preferred embodiment, the operation request corresponds to a function call and the operation response corresponds to an execution result of a function called by the function call.

Additionally, the second communication apparatus may be arranged to transmit the operation request and the operation response as a communication request; and the first communication apparatus may be arranged to transmit the operation request and the operation response as a communication response to the communication request from the second communication apparatus.

Also, the second communication apparatus may be arranged to periodically transmit the communication request to the first communication apparatus.

According to another embodiment, a communication method of the present invention includes the steps of:

transmitting from a first communication apparatus to a second communication apparatus a SOAP request to be transmitted to the second communication apparatus and a SOAP response to a SOAP request received from the second communication apparatus that are described in one message; and transmitting from the second communication apparatus to the first communication apparatus a SOAP request to be transmitted to the first communication apparatus and a SOAP response to a SOAP request received from the first communication apparatus that are described in one message.

Further, in a preferred embodiment, the SOAP request describes a function call and the SOAP response describes an execution result of a function called by the function call.

Additionally, the second communication apparatus may be arranged to transmit to the first communication apparatus an HTTP request that describes the SOAP request and SOAP response to be transmitted to the first communication apparatus, and the first communication apparatus may be arranged to transmit to the second communication apparatus an HTTP response to the HTTP request that describes the SOAP request and SOAP response to be transmitted to the second communication apparatus.

Also, the second communication apparatus may be arranged to periodically transmit the HTTP request to the first communication apparatus.

According to the communication method of the present invention, an operation request to a communication counterpart and an operation response to an operation request received from the communication counterpart may be collectively transmitted in one connection so that the communication overhead can be reduced and communication efficiency can be improved.

In another aspect of the present invention, a communication apparatus adapted to communicate with another communication apparatus as a communication counterpart includes:

transmitting means for collectively transmitting to the communication counterpart an operation request to be transmitted to the communication counterpart and an operation response to an operation request from the communication counterpart that are combined in one batch;

receiving means for collectively receiving from the communication counterpart an operation response to the operation request transmitted to the communication counterpart and an operation request from the communication counterpart that are combined in one batch; and means for executing an operation according to the operation request from the communication counterpart, and generating an operation response to said operation request as an execution result of said operation.

Further, in a preferred embodiment, the operation request corresponds to a function call, and the operation response corresponds to an execution result of a function called by the function call.

According to another embodiment, a communication apparatus of the present invention that is adapted to communicate with another communication apparatus as a communication counterpart includes:

first storage means for storing an operation request from the communication counterpart and an operation response to said operation request;

second storage means for storing an operation request to the communication counterpart and an operation response to said operation request;

request generating means for generating the operation request to the communication counterpart and storing said operation request in the second storage means;

response generating means for reading from the first storage means the operation request from the communication counterpart, executing an operation according to said operation request, generating the operation response to said operation request an execution result of said operation, and storing in the first storage means the generated operation response in association with the read operation request;

gathering means for reading from the first storage means the operation response to the operation request from the communication counterpart, and reading from the second storage means the operation request to the communication counterpart;

transmitting means for collectively transmitting to the communication counterpart the operation response and the operation request read by the gathering means in one batch;

receiving means for collectively receiving from the communication counterpart the operation response to the operation request transmitted to the communication counterpart and the operation request from the communication counterpart in one batch; and distributing means for storing in the first storage means the operation request from the communication counterpart received by the receiving means, and storing in the second storage means the operation response to the operation request transmitted to the communication counterpart in association with the operation request transmitted to the communication counterpart.

Further, in a preferred embodiment, the transmitting means is arranged to transmit to the communication counterpart the operation request and the operation response as respective SOAP messages, and the receiving means is arranged to receive from the communication counterpart the operation request and the operation response as respective SOAP messages.

Additionally the communication apparatus of the present embodiment may further include:

means for assigning priority information to the operation requests stored in the first storage means and the operation request stored in the second storage means; wherein the response generating means is arranged to successively read from the first storage means the operation request from the communication counterpart, generate the operation response to said operation request, and store the generated operation response in the first storage means according to the priority information; and the gathering means is arranged to successively read from the first storage means the operation response to the operation request from the communication counterpart according to the priority information, and successively read from the second storage means the operation request to the communication counterpart according to the priority information.

According to another embodiment, a communication apparatus of the present invention that is adapted to communicate with another communication apparatus as a communication counterpart includes:

transmitting means for collectively transmitting to the communication counterpart a SOAP request to be transmitted to the communication counterpart and a SOAP response to a SOAP request from the communication counterpart that are described in one message;

receiving means for collectively receiving from the communication counterpart a SOAP response to a SOAP request transmitted to the communication counterpart and a SOAP request from the communication counterpart that are described in one message; and means for executing an operation being requested by the SOAP request from the communication counterpart and generating the SOAP response describing an execution result of said SOAP request.

Further, in a preferred embodiment, the SOAP request describes a function call, and the SOAP response describes an execution result of a function called by the function call.

According to another embodiment, a communication apparatus of the present invention that is adapted to communicate with another communication apparatus as a communication counterpart includes:

first storage means for storing an operation request from the communication counterpart and an operation response to said operation request;

second storage means for storing an operation request to the communication counterpart and an operation response to said operation request;

request generating means for generating the operation request to the communication counterpart and storing said operation request in the second storage means;

response generating means for reading from the first storage means the operation request from the communication counterpart, executing an operation according to said operation request, generating the operation response to said operation request as an execution result of said operation, and storing the generated operation response in association with the read operation request in the first storage means;

gathering means for reading from the first storage means the operation response to the operation request from the communication counterpart, and reading from the second storage means the operation request to the communication counterpart;

transmitting means for collectively transmitting to the communication counterpart a SOAP response describing a content of the operation response read by the gathering means and a SOAP response describing a content of the operation request read by the gathering means that are described in one message;

receiving means for collectively receiving from the communication counterpart the SOAP response describing the content of the operation response to the operation request transmitted to the communication counterpart and the SOAP request describing the content of the operation request that are described in one message; and distributing means for storing in the first storage means the content of the operation request from the communication counterpart described in the SOAP request received by the receiving means, and storing in the second storage means the content of the operation response to the operation request transmitted to the communication counterpart described in the received SOAP response in association with the operation request transmitted to the communication counterpart.

Also, the communication apparatus of the present embodiment may further include:

means for assigning priority information to the operation request stored in the first storage means and the operation request stored in the second storage means; wherein the response generating means is arranged to successively read from the first storage means the operation request from the communication counterpart, generate the operation response to said operation request, and store the generated operation response in the first storage means according to the priority information; and the gathering means is arranged to successively read from the first storage means the operation response to the operation request from the communication counterpart according to the priority information, and successively read from the second storage means the operation request to the communication counterpart according to the priority information.

In another aspect of the present invention, a communication system implementing a plurality of the communication apparatuses of the present invention that are adapted to communicate with each other as communication counterparts is provided.

In another aspect of the present invention, a communication apparatus control method for controlling a communication apparatus of the present invention that is adapted to communicate with another communication apparatus as a communication counterpart is provided.

In another aspect of the present invention, a medium that stores programs for controlling a computer to function as a communication apparatus of the present invention that is adapted to communicate with another communication apparatus as a communication counterpart is provided.

According to the communication apparatus, communication system, and communication apparatus control method of the present invention, communication efficiency can be improved in a communication system implementing a plurality of communication apparatuses that are arranged to exchange an operation request and an operation response to a received operation request with each other. Also, according to the media storing the programs for controlling a computer to function as the communication apparatus of the present invention, the features of the communication apparatus of the present invention may be realized in the computer so as to obtain the advantageous effects of the present invention.

In another aspect of the present invention, a communication client that is adapted to transmit a communication request to a communication server, and receive a communication response to the communication request from the communication server is provided, wherein the communication request describes a client request corresponding to an operation request to the communication server, and the communication response describes an operation response to the client request, includes:

transmitting means for collectively transmitting to the communication server the client request and an operation response to a server request corresponding to an operation request from the communication server that are described together in the communication request;

receiving means for collectively receiving from the communication server the operation response to the client request transmitted to the communication server and the server request that are described together in the communication response to the communication request; and means for executing an operation according to the server request and generating the operation response to the server request as an execution result of said operation.

Further, in a preferred embodiment, the operation request corresponds to a function call, and the operation response corresponds to an execution result of a function called by the function call.

According to another embodiment, a communication client of the present invention that is adapted to transmit a communication request to a communication server, and receive a communication response to said communication request from the communication server, wherein the communication request describes a client request corresponding to an operation request to the communication server, and the communication response describes an operation response to the client request, includes:

first storage means for storing a server request corresponding to an operation request from the communication server and an operation response to said server request;

second storage means for storing the client request and an operation response to said client request;

request generating means for generating the client request and storing the generated client request in the second storage means;

response generating means for reading the server request from the first storage means, executing an operation according to said server request, generating the operation response to said server request as an execution result of said operation, and storing in the first storage means the generated operation response in association with the read server request;

gathering means for reading the operation response to the server request from the first storage means, and reading the client request from the second storage means;

transmitting means for collectively transmitting to the communication server the read operation response and client request that are described together in the communication request;

receiving means for collectively receiving from the communication server the operation response to the client request transmitted to the communication server and the server request that are described together in the communication response to the communication request; and distributing means for storing in the first storage means the server request received by the receiving means, and storing in the second storage means the received operation response to the client request transmitted to the communication server in association with the client request transmitted to the communication server.

Further, in a preferred embodiment, the transmitting means is arranged to periodically transmit the communication request to the communication server.

Additionally, the transmitting means may be arranged to transmit to the communication server the operation request and the operation response as respective SOAP messages, and the receiving means may be arranged to receive from the communication server the operation request and the operation response as respective SOAP messages.

Also, the communication client of the present embodiment may further include:

means for assigning priority information to the server request stored in the first storage means and the client request stored in the second storage means; wherein the response generating means is arranged to successively read the server request from the first storage means, generate the operation response to said server request, and store the generated operation response in the first storage means according to the priority information; and the gathering means is arranged to successively read the operation response to the server request from the first storage means according to the priority information, and successively read the client request from the second storage means according to the priority information.

According to another embodiment, a communication client of the present invention that is adapted to transmit an HTTP request to a communication server, and receive an HTTP response to said HTTP request from the communication server, wherein the HTTP request describes a SOAP request to the communication server, and the HTTP response describes a SOAP response to the SOAP request, includes:

transmitting means for collectively transmitting to the communication server the SOAP request and a SOAP response to a SOAP request from the communication server that are described together in the HTTP request;

receiving means for collectively receiving from the communication server the SOAP response to the SOAP request transmitted to the communication server and the SOAP request from the communication server that are described together in the HTTP response; and means for executing an operation according to the SOAP request received from the communication server and generating an execution result of said operation that is to be described in the SOAP response to said SOAP request.

Further, in a preferred embodiment, the SOAP request describes a function call, and the SOAP response describes an execution result of a function called by the function call.

According to another embodiment, a communication client of the present invention that is adapted to transmit an HTTP request to a communication server, and receive an HTTP response to said HTTP request from the communication server, wherein the HTTP request describes a SOAP request to the communication server, and the HTTP response describes a SOAP response to the SOAP request, includes:

first storage means for storing a server request corresponding to an operation request from the communication server and an operation response to said server request;

second storage means for storing a client request corresponding to an operation request to the communication server and an operation response to said client request;

request generating means for generating the client request and storing the generated client request in the second storage means;

response generating means for reading the server request from the first storage means, executing an operation according to said server request, generating the operation response to said server request as an execution result of said operation, and storing in the first storage means the generated operation response in association with the read server request;

gathering means for reading the operation response to the server request from the first storage means, and reading the client request from the second storage means;

transmitting means for collectively transmitting to the communication server the SOAP response describing a content of the operation response read by the gathering means and the SOAP request describing a content of the client request read by the gathering means that are described together in the HTTP request;

receiving means for collectively receiving from the communication server the SOAP response to the SOAP request transmitted to the communication server and the SOAP request from the communication server that are described together in the HTTP response to the HTTP request; and distributing means for storing in the first storage means the content of the server request described in the SOAP request received by the receiving means, and storing in the second storage means the content of the operation response to the client request transmitted to the communication server described in the SOAP response received by the receiving means in association with the client request transmitted to the communication server.

Further, in a preferred embodiment, the transmitting means is arranged to periodically transmit the HTTP request to the communication server.

Also, the communication client of the present embodiment may further include:

means for assigning priority information to the server request stored in the first storage means and the client request stored in the second storage means; wherein the response generating means is arranged to successively read the server request from the first storage means, generate the operation response to said server request, and store the generated operation response in the first storage means according to the priority information; and the gathering means is arranged to successively read the operation response to the server request from the first storage means according to the priority information, and successively read the client request from the second storage means according to the priority information.

In another aspect of the present invention, a communication client control method for controlling the communication client of the present invention that is adapted to transmit a communication request to a communication server and receive a communication response to the communication request from the communication server is provided.

In another aspect of the present invention, a medium that stores programs for controlling a computer to function as a communication client of the present invention that is adapted to transmit a communication request to a communication server and receive a communication response to the communication request from the communication server is provided.

According to the communication client and communication client control method of the present invention, communication efficiency can be improved in the transmission/reception of an operation request and an operation response to a received operation request performed between a plurality of communication apparatuses that are arranged to either transmit a communication request and receive a communication response to the communication request or receive a communication request and transmit a communication response to this communication request. Also, according to the medium storing programs for controlling a computer to function as a communication client of the present invention, the features of the communication client of the present invention may be realized in the computer so that the advantageous effects of the present invention may be realized.

In another aspect of the present invention, a communication server that is adapted to receive a communication request from a communication client, and transmit a communication response to said communication request to the communication client, wherein the communication request describes a client request corresponding to an operation request from the communication client, and the communication response describes an operation response to the client request, includes:

receiving means for collectively receiving from the communication client the client request and an operation response to a server request corresponding to an operation request transmitted to the communication client that are described together in the communication request;

transmitting means for collectively transmitting to the communication client the operation response to the client request received from the communication client and the server request that are described together in the communication response to the communication request; and means for executing an operation according to the client request and generating the operation response to the client request as an execution result of said operation.

Further, in a preferred embodiment, the operation request corresponds to a function call, and the operation response corresponds to an execution result of a function called by the function call.

According to another embodiment, a communication server of the present invention that is adapted to receive a communication request from a communication client, and transmit a communication response to said communication request to the communication client, wherein the communication request describes a client request corresponding to an operation request from the communication client, and the communication response describes an operation response to the client request, includes:

first storage means for storing the client request and an operation response to said client request;

second storage means for storing a server request corresponding to an operation request to the communication client and an operation response to said server request;

request generating means for generating the server request and storing the generated server request in the second storage means;

response generating means for reading the client request from the first storage means, executing an operation according to said client request, generating the operation response to said client request as an execution result of said operation, and storing in the first storage means the generated operation response in association with the read client request;

receiving means for collectively receiving from the communication client the client request and the operation response to the server request transmitted to the communication client that are described together in the communication request;

distributing means for storing in the first storage means the client request received by the receiving means, and storing in the second storage means the received operation response to the server request transmitted to the communication client in association with the server request transmitted to the communication client;

gathering means for reading the operation response to the client request from the first storage means, and reading the server request from the second storage means; and transmitting means for collectively transmitting to the communication client the read operation response and server request that are described together in the communication response.

Further in a preferred embodiment, the receiving means is arranged to receive the operation response and the operation request from the communication client as respective SOAP messages, and the transmitting means is arranged to transmit the operation response and the operation request to the communication client as respective SOAP messages.

Also, the communication server of the present embodiment may further include:

means for assigning priority information to the client request stored in the first storage means and the server request stored in the second storage means; wherein the response generating means is arranged to successively read the client request from the first storage means, generate the operation response to said client request, and store the generated operation response in the first storage means according to the priority information; and the gathering means is arranged to successively read the operation response to the client request from the first storage means according to the priority information, and successively read the server request from the second storage means according to the priority information.

According to another embodiment, a communication server of the present invention that is adapted to receive an HTTP request from a communication client, and transmit an HTTP response to said communication request to the communication client, wherein the HTTP request describes a SOAP request from the communication client, and the HTTP response describes a SOAP response to said SOAP request, includes:

receiving means for collectively receiving from the communication client the SOAP request and a SOAP response to a SOAP request transmitted to the communication client that are described together in the HTTP request;

transmitting means for collectively transmitting to the communication client the SOAP response to the SOAP request from the communication client and the SOAP request to the communication client that are described together in the HTTP response to the HTTP request; and means for executing an operation according to the SOAP request received from the communication client and generating an execution result of said operation that is to be described in the SOAP response to said SOAP request.

Further, in a preferred embodiment, the SOAP request describes a function call, and the SOAP response describes an execution result of a function called by the function call.

According to another embodiment, a communication server of the present invention that is adapted to receive an HTTP request from a communication client, and transmit an HTTP response to said communication request to the communication client, wherein the HTTP request describes a SOAP request from the communication client, and the HTTP response describes a SOAP response to said SOAP request, includes:

first storage means for storing a client request corresponding to an operation request from the communication client and an operation response to said client command;

second storage means for storing a server request corresponding to an operation request to the communication client and an operation response to said server request;

request generating means for generating the server request and storing the generated server request in the second storage means;

response generating means for reading the client request from the first storage means; executing an operation according to said client request, generating the operation response to said client request as an execution result of said operation, and storing in the first storage means the generated operation response in association with the read client request;

receiving means for collectively receiving from the communication client the SOAP request describing the client request and the SOAP response, corresponding to a response to the SOAP request transmitted to the communication client and describing the operation response to the server request transmitted to the communication client, that are described together in the HTTP request;

distributing means for storing in the first storage means a content of the client request described in the SOAP request received by the receiving means and storing in the second storage means a content of the operation response described in the SOPA response received by the receiving means in association with the server request transmitted to the communication client;

gathering means for reading the operation response to the client request from the first storage means, and reading the server request from the second storage means; and transmitting means for collectively transmitting to the communication client the SOAP response describing the content of the operation response read by the gathering means and the SOAP request describing the content of the operation request read by the gathering means that are described together in the HTTP response to the HTTP request.

Also, the communication server of the present embodiment may further include:

means for assigning priority information to the client request stored in the first storage means and the server request stored in the second storage means; wherein the response generating means is arranged to successively read the client request from the first storage means, generate the operation response to said client request, and store the generated operation response in the first storage means according to the priority information; and the gathering means is arranged to successively read the operation response to the client request from the first storage means according to the priority information, and successively read the server request from the second storage means according to the priority information.

In another aspect of the present invention, a communication server control method for controlling the communication server of the present invention that is adapted to receive a communication request from a communication client and transmit a communication response to the communication request to the communication client is provided.

In another aspect of the present invention, a medium that stores programs for controlling a computer to function as the communication server of the present invention that is adapted to receive a communication request from a communication client and transmit a communication response to the communication request to the communication client is provided.

According to the communication server and communication server control method of the present invention, communication efficiency can be improved in the transmission/reception of an operation request and an operation response to a received operation request performed between a plurality of communication apparatuses that are arranged to either transmit a communication request and receive a communication response to this communication request or receive a communication request and transmit a communication response to this communication request. Also, according to the medium storing the programs for controlling a computer to function as the communication server, features of the communication server of the present invention may be realized in the computer so that the advantageous effects of the present invention may be realized.

In another aspect of the present invention, a communication system implementing the communication client and communication server of the present invention is provided, wherein the communication client transmits a communication request to the communication client and receives a communication response to the communication request from the communication client.

In another aspect of the present invention, a communication system control method for controlling the communication client and communication server of the present invention is provided, wherein the communication client transmits a communication request to the communication server and receives a communication response to the communication request from the communication server.

According to the communication system and communication system control method of the present invention, communication efficiency can be improved in a communication system for realizing an exchange of an operation request and an operation response to the operation request between a plurality of communication apparatuses that are arranged to either transmit a communication request and receive a communication response to this communication request or receive a communication request and transmit a communication response to this communication request.

BRIEF DESCRIPTION OF THE DRAWINGS

FIG. 8 is a block diagram illustrating an exemplary functional configuration of the HTTP client shown in FIG. 3 for realizing processes pertaining to a command and command response;

FIG. 9 shows an exemplary data configuration of a client command sheet stored in a client command pool shown in FIG. 8;

FIG. 10 shows an exemplary data configuration of a server command sheet stored in a server command pool shown in FIG. 8;

FIG. 11 shows an example of an HTTP request that is to be transmitted to the HTTP server by the HTTP client shown in FIG. 3;

FIG. 12 shows an example of an HTTP response from the HTTP server received by the HTTP client shown in FIG. 3;

FIG. 13 shows an example of a part describing a client command;

FIG. 14 shows an example of a part describing a response to a client command;

FIG. 15 shows an example of a part describing a server command;

FIG. 16 shows an example of a part describing a response to a server command;

FIG. 22 is a block diagram illustrating an exemplary functional configuration of the HTTP server shown in FIG. 3 for performing processes pertaining to the command and the command response;

FIG. 23 shows an exemplary data configuration of a server command sheet that is to be stored in the server command pool of FIG. 22;

FIG. 24 shows an exemplary data configuration of a client command sheet that is to be stored in the client command pool of FIG. 22;

FIG. 25 is a flowchart illustrating a basic operation flow of a message gathering and distributing process performed in the HTTP server of FIG. 3;

FIG. 34 shows an exemplary electronic mail to be sent from one communication apparatus to another communication apparatus of the communication system shown in FIG. 30;

DESCRIPTION OF THE PREFERRED EMBODIMENTS

In the following, preferred embodiments of the present invention are described with reference to the accompanying drawings.

Figure 1:
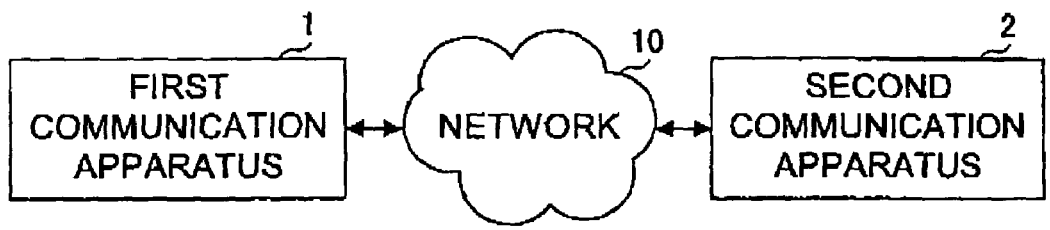
FIG. 1 shows an exemplary configuration of a communication system implementing communication apparatuses according to an embodiment of the present invention.

FIG. 1 shows an exemplary configuration of a communication system using communication apparatuses according to an embodiment of the present invention.

As is shown in the drawing, this communication system includes a network 10 that establishes a connection between a first communication apparatus 1 and a second communication apparatus 2 (i.e., nodes) each corresponding to a communication apparatus of the present invention.

For the first communication apparatus 1 and the second communication apparatus 2, a computer such as a PC having communication functions, or other various electronic apparatuses having communication and information processing functions may be used. As for the network 10, the Internet, a LAN (local area network), or other various communication routes that enable network communication may be used regardless of whether it is wired or wireless.

The first communication apparatus 1 and the second communication apparatus 2 implement various application programs for controlling and managing each other. The application programs may be stored in storage means and used to perform various processes of the communication apparatuses 1 and 2. In the present embodiment, each node is arranged to send to a counterpart node an 'operation request', which corresponds to a request for an execution of a method (process) of an application program implemented in the counterpart node, and acquire from this counterpart node an 'operation response', which corresponds to a processing result of the requested process, using RPC (remote procedure call). In other words, the first communication apparatus 1 is capable of generating a request to the second communication apparatus 2 (referred to as 'first communication apparatus request' hereinafter), transmitting the first communication apparatus request to the second communication apparatus 2, and acquiring a response to this request. The second communication apparatus 2 is capable of generating a request to the first communication apparatus 1 (referred to as 'second communication apparatus request' hereinafter), handing the second communication apparatus request to the first communication apparatus 1, and acquiring a response to this request.

It is noted that in the present application, a method is defined as a logical function prescribing an input and output format. Thus, the operation request corresponds to a procedure call for calling the prescribed function, and the operation response corresponds to the execution result of the function called by the procedure call.

Figure 2A:
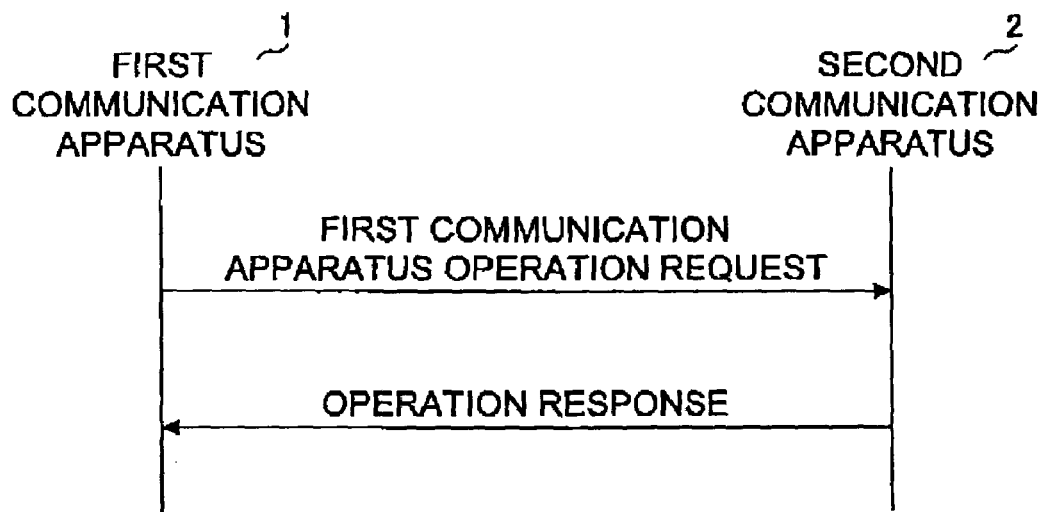
FIGS. 2A and 2B illustrate a relation between an operation request and an operation response in the communication system of FIG. 1.
Figure 2B:
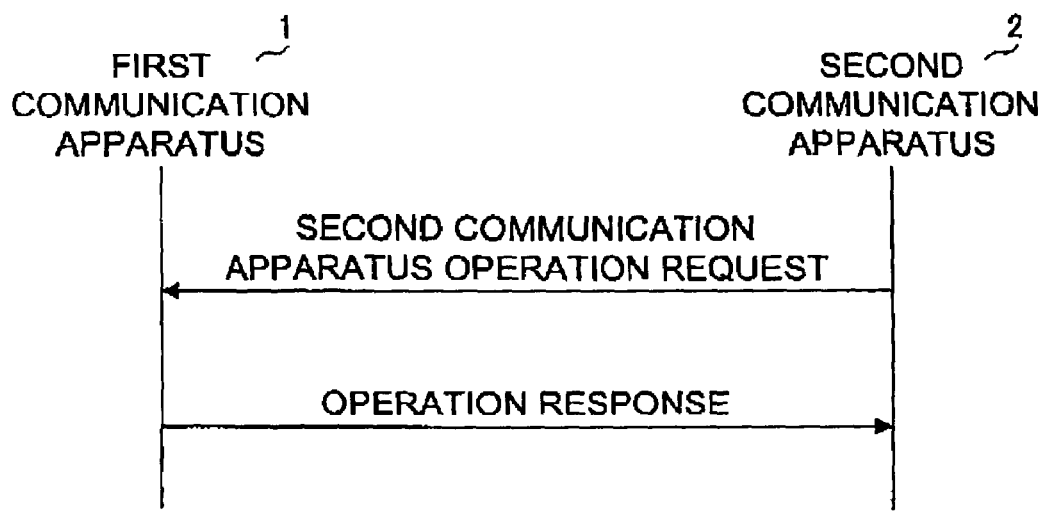

FIGS. 2A and 2B show a relation between the operation request and the operation response.

FIG. 2A illustrates a case in which an operation request to the second communication apparatus 2 is generated at the first communication apparatus 1. In this model, the first communication apparatus 1 generates a first communication apparatus operation request and sends this to the second communication apparatus 2, and the second communication apparatus 2 receiving this request sends back an operation response to this request.

FIG. 2B illustrates a case in which an operation request to the first communication apparatus 1 is generated at the second communication apparatus 2. In this model, the second communication apparatus 2 generates a second communication apparatus operation request and sends this to the first communication apparatus 1, and the first communication apparatus 1 receiving this request sends back an operation response to this request.

It is noted that in the present embodiment, SOAP (simple object access protocol) is used as a protocol for transmitting the argument and return value of an RPC (to be described later), and the above-described operation request and operation response are referred to as SOAP documents.

The present invention is characterized in that, in an arrangement where a plurality of communication apparatuses transmit/receive operation requests and operation responses to received operation requests to/from each other, as described above, for example, an operation request that is to be sent to a communication counterpart (i.e., communication apparatus at the other end of the connection) and an operation response to an operation request received from the communication counterpart are combined and collectively sent.

In the present invention, a communication protocol for transmitting an operation request or an operation response is used. For example, HTTP (HyperText transfer Protocol) or SMTP (Simple Mail Transfer Protocol) may be used as the communication protocol depending on the configuration of the communication system. It is noted that a communication system using SMTP may not transmit/receive a communication request and a corresponding communication response in one connection as in a communication system using HTTP.

Thus, first, an embodiment using HTTP as the communication protocol will be described, and then a case of using SMTP as the communication protocol will be described as a reference example.

[Embodiment Using HTTP: FIGS. 3~21]

Figure 3:
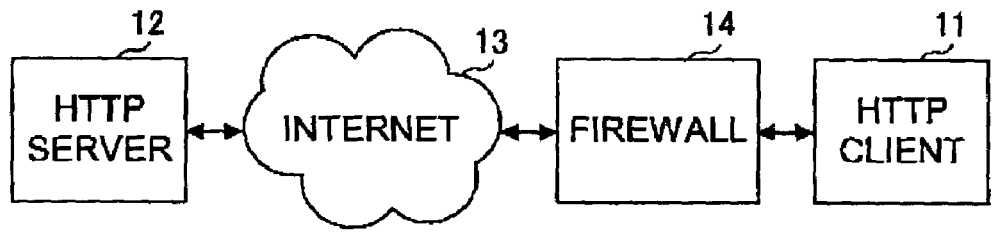
FIG. 3 shows an exemplary configuration of a communication system in an embodiment using HTTP as a communication protocol.

FIG. 3 shows an exemplary configuration of a communication system according to an embodiment using HTTP.

As is shown in the drawing, this communication system includes an HTTP server 12, an HTTP client 11, and Internet 13 that interconnects the HTTP server 12 and the HTTP client 11. The HTTP client 11 is connected to the Internet 13 via a firewall 14 to ensure security. The HTTP server 12 corresponds to the communication server or the first communication apparatus, and the HTTP client corresponds to the communication client or the second communication apparatus.

In performing communication using HTTP, the firewall 14 prevents a node stationed outside to freely access a node stationed within the firewall 14, and data is sent to the node within as a communication response (HTTP response) to a communication request (HTTP request) sent from this node. In this communication system, the HTTP client 11 corresponds to the node stationed within the firewall 14 and the HTTP server 12 corresponds to the node stationed outside the firewall 14. However, in implementations other than the communication between the nodes, these nodes are not limited to functioning as a server or a client.

Also, as in the first communication apparatus 1 and the second communication apparatus 2 shown in FIG. 1, the HTTP server 12 and the HTTP client 11 implement application programs to control and manage each other. Further, using RPC (remote procedure call), the HTTP server 12 and the HTTP client 11 are capable of sending to each other an 'operation request' corresponding to a call to perform a method (process) of an application program implemented at the other side (i.e., the receiver of the 'operation request'), and acquiring an 'operation response' corresponding to the processing result of this 'operation request'.

Figure 4A:
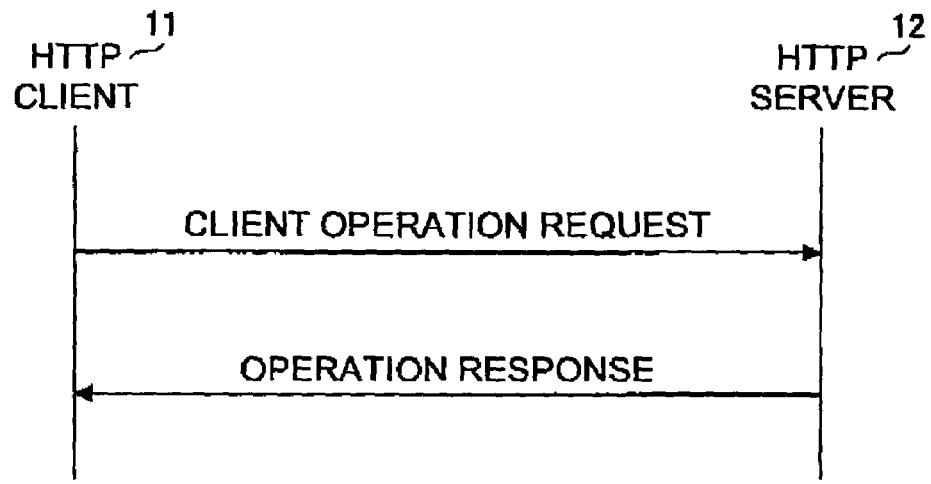
FIGS. 4A and 4B illustrate a relation between an operation request and an operation response in the communication system of FIG. 3.
Figure 4B:
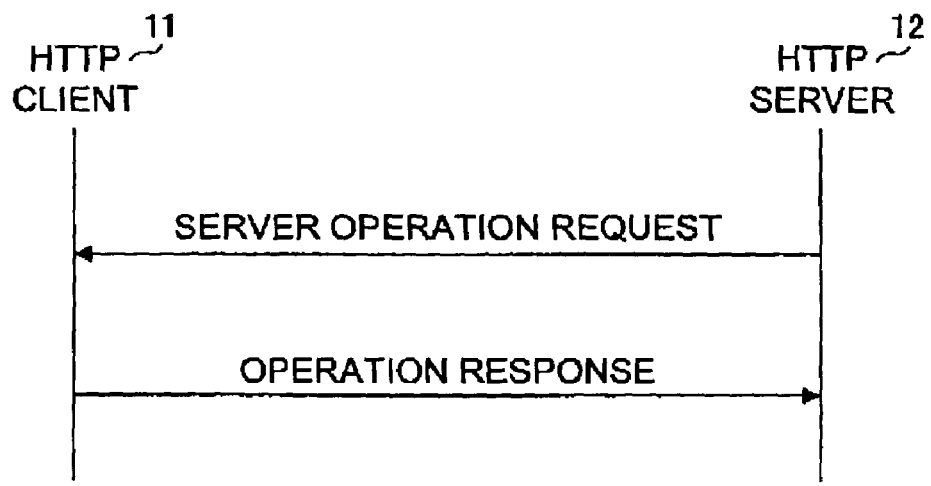

FIGS. 4A and 4B illustrate a relation between the operation request and the operation response according to this embodiment.

FIG. 4A illustrates a case in which an operation request to the HTTP server 12 is generated at the HTTP client 11. In this model, the HTTP client 11 generates a client operation request (also referred to herein as 'client command') and sends this request to the HTTP server 12, and the HTTP server 12 receiving this request sends back an operation response to this command (this response also being referred to herein as 'command response' or simply 'response').

FIG. 4B illustrates a case in which an operation request to the HTTP client 11 is generated at the HTTP server 12. In this model, the HTTP server 12 generates a server operation request (also referred to herein as 'server command') and sends this request to the HTTP client 11, and the HTTP client 11 receiving this command sends back an operation response to this command.

As is described above, in the RPC level, the operation request and the operation response are equally handled both at the HTTP client 11 side and the HTTP server 12 side. However, in the communication level, this is not the case; namely, one side is arranged to send an HTTP request whereas the other side is arranged to send an HTTP response.

Figure 5:
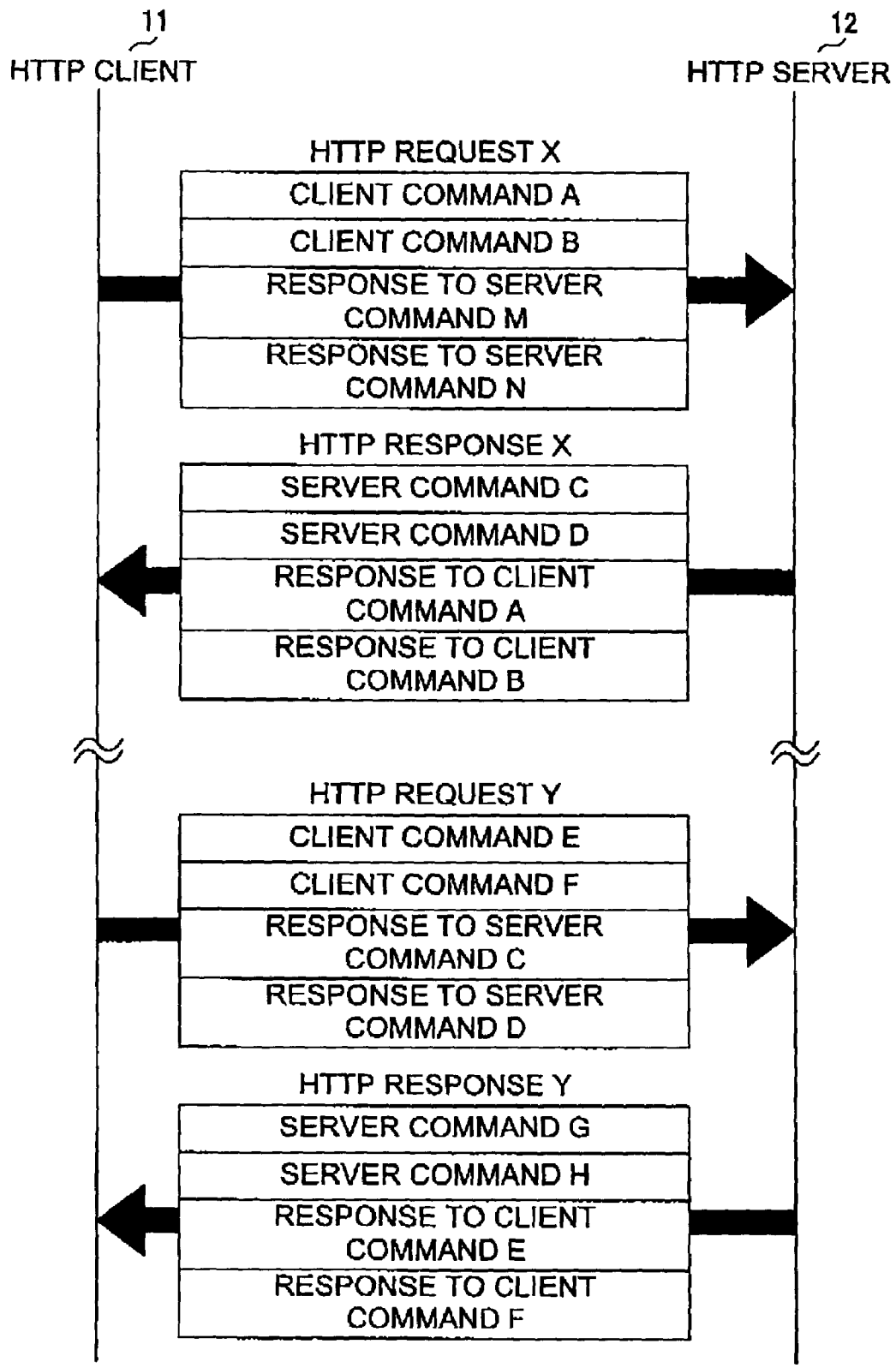
FIG. 5 illustrates an exemplary communication sequence in the communication system of FIG. 3.

FIG. 5 illustrates an exemplary communication sequence in the communication system according to the present embodiment.

As is shown in the drawing, in this communication system, the HTTP client 11 is arranged to send an HTTP request to the HTTP server 12 as a communication request, and the HTTP server 12 is arranged to send back an HTTP response to the HTTP client 11 as a communication response to the communication request. For example, the HTTP client 11 may send an HTTP request X and the HTTP server 12 may respond by sending back an HTTP response X, or similarly, the HTTP client 11 may send an HTTP request Y and the HTTP server 12 may respond by sending back an HTTP response Y.

In the illustrated exemplary embodiment, an HTTP request of a communication sequence may include, a client command corresponding to an operation request to be sent from the HTTP client 11 to the HTTP server 12 and/or a response to a server command that has been sent from the HTTP server 12 to the HTTP client 11 (command response). Similarly, an HTTP response may include, a server command corresponding to an operation request to be sent from the HTTP server 12 to the HTTP client 11 and/or a response to a client command that has been sent from the HTTP client 11 to the HTTP server 12 (command response).

For example, in FIG. 5, a client command A to be sent from the HTTP client 11 to the HTTP server 12 is described in the HTTP request X, and a corresponding command response to the client command A is described in the HTTP response X to the HTTP request X. On the other hand, a server command C to be sent from the HTTP server 12 to the HTTP client 11 is described in the HTTP response X to the HTTP request X, and a corresponding command response to the server command C is described in an HTTP request Y.

Also, in the case of FIG. 4A, the HTTP client 11 is able to establish a connection with the HTTP server 12 immediately after a client command is generated to include the generated command in an HTTP request and transmit this to the HTTP server 12. However, in the case of FIG. 4B, the firewall 14 implemented at the HTTP client 11 side blocks an HTTP request from the HTTP server 12 side and, therefore, the HTTP server 12 is unable to establish a connection with the HTTP client 11 to transmit a generated server command right away.

It is also noted that any number (including 0) of client commands and responses to server commands may be described in one HTTP request, and any number (including 0) of server commands and responses to client commands may be described in one HTTP response. The contents described in one HTTP request or HTTP response are logically transferred in one bundle.

In this way, the number of connections required in transmitting information may be reduced so that communication overhead is reduced and communication efficiency is enhanced.

Figure 6:
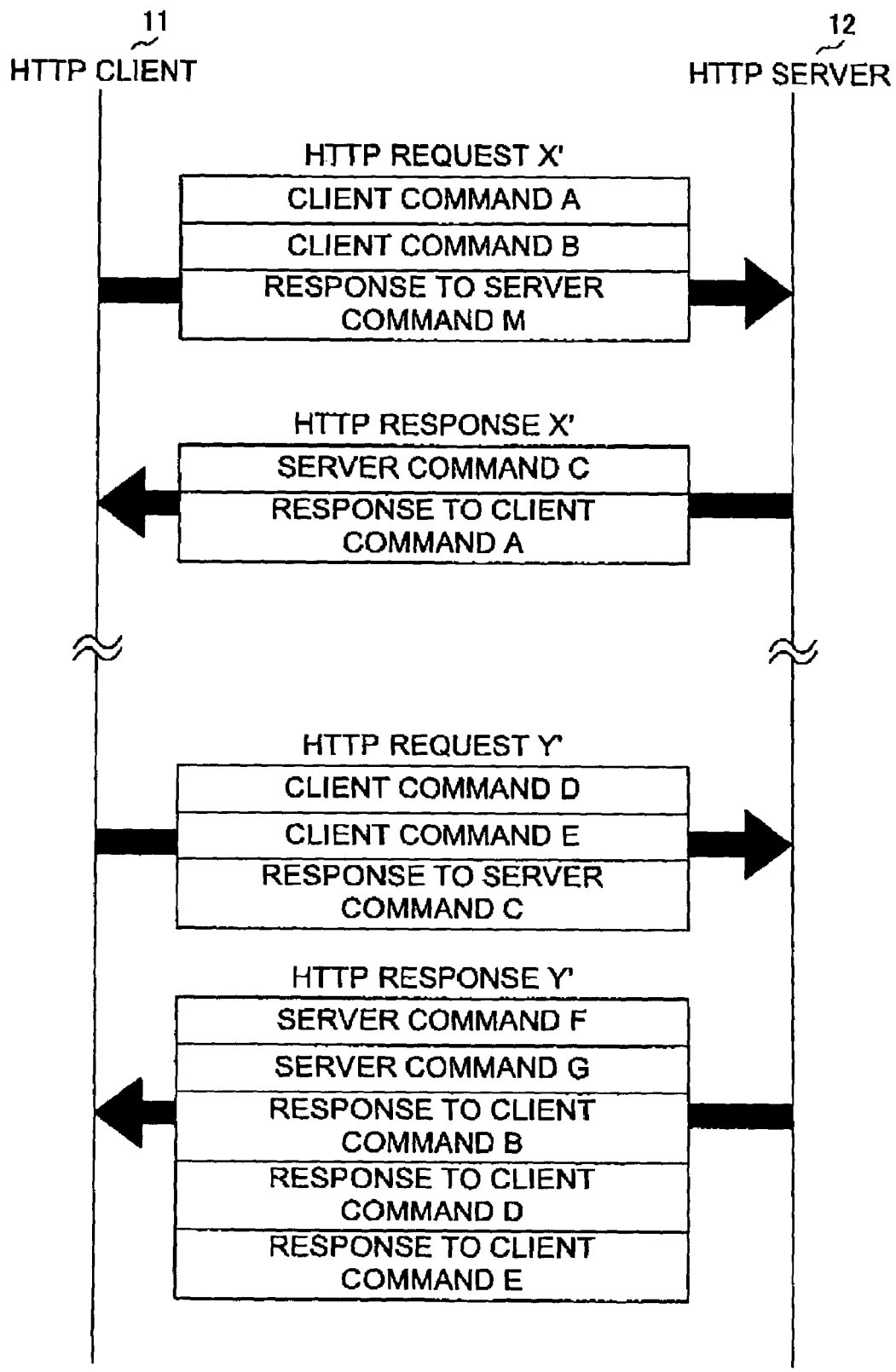
FIG. 6 illustrates another exemplary communication sequence in the communication system of FIG. 3.

FIG. 6 illustrates another exemplary communication sequence in the communication system according to the present embodiment.

In FIG. 5, a very simple sequence example has been given in order to simplify the explanation. In FIG. 6, an example is given in which the number of commands and command responses described in each HTTP request or HTTP response is varied.

In the example of FIG. 6, a response to a received command may be sent back at the first transmission opportunity or any transmission opportunity thereafter. For example, a client command B shown in FIG. 6 is described in a HTTP request X', but the corresponding command response to the client command B is not described in the HTTP response X' of the HTTP request. Instead, the command response is described in a subsequent HTTP response Y'.

As will be appreciated, the above may apply to the server command as well. Thus, a command response to a server command described in an HTTP response may be described in any HTTP request that is transmitted after the reception of this HTTP response.

It is noted that each command and command response is generated independently and, thus, when one or more commands and/or command responses are to be processed together to be transferred in one bundle as described above, these commands and/or command responses are combined for the transmission. Then, after transmission, a separation process is performed on the combined commands and/or command responses.

In the following, a hardware configuration of the HTTP client 11 and the HTTP server 12, a functional configuration for realizing the above described processes, and procedural steps for realizing the processes will be described.

Figure 7:
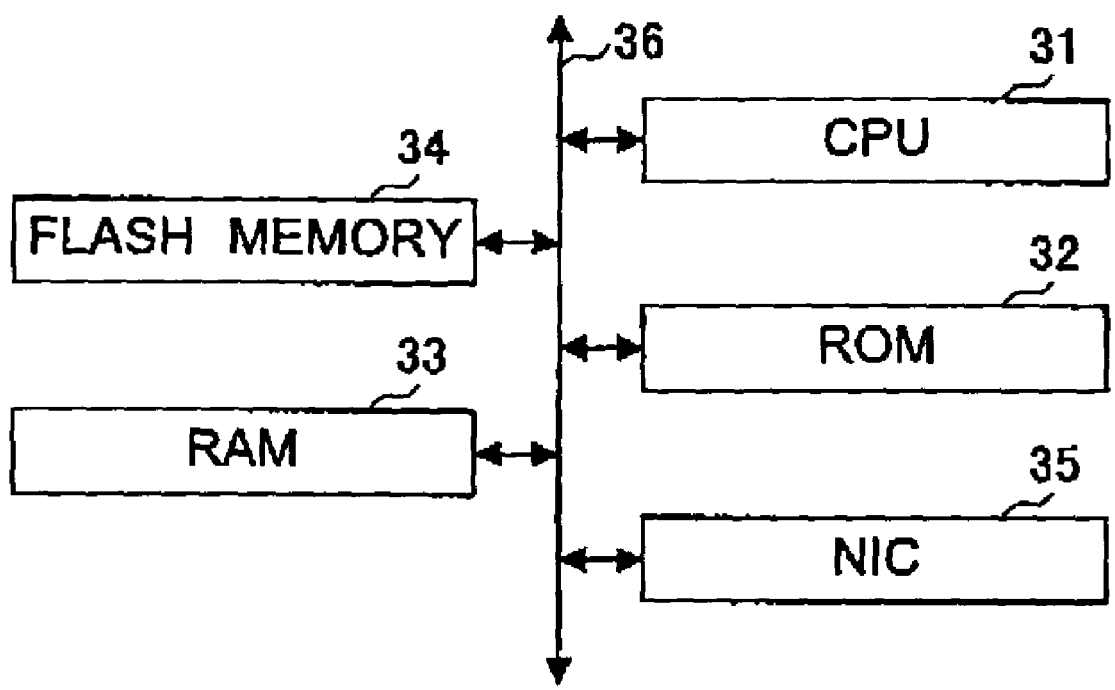
FIG. 7 shows an exemplary hardware configuration of an HTTP client and an HTTP server shown in FIG. 3.

FIG. 7 shows an exemplary hardware configuration of the HTTP client 11 and HTTP server 12.

As is shown in the drawing, each HTTP client 11 and HTTP server 12 includes a CPU 31, a ROM 32, a RAM 33, a flash memory 34, a network interface card (NIC) 35, and a system bus 36 interconnecting the above elements.

The CPU 31 corresponds to control means for realizing overall control over the HTTP client 11 and HTTP server 12 using a control program stored in the ROM 32. The ROM 32 is a read only memory storing various sets of fixed data including the control program used by the CPU 31.

The RAM 33 is a temporary storage memory used as a working memory for the CPU to perform data processing, for example. The flash memory 34 is a nonvolatile memory that is able to retain its stored contents even when the power of the apparatus is turned off. The NIC 35 corresponds to communication means for transmitting/receiving information to/from a communication counterpart via a network such as the Internet 13.

FIG. 8 is a block diagram illustrating a functional configuration of the HTTP client 11 for realizing processes pertaining to commands and command responses.

Of the functions shown in FIG. 8, a client command pool 41 and a server command pool 42 are implemented in any rewritable storage means of the HTTP client 11. Client command generating means 43, server command execution result generating means 44, outgoing message gathering means 45, and received message distributing means 48 are realized by the CPU 31. Also, HTTP request transmitting means 46 and HTTP response receiving means 47 are realized by the CPU 31 and the NIC 35.

In the following, further details of the above functions are described.

The client command pool 41 corresponds to a second storage area implemented in the HTTP client 11, and registers a client command, a response to this command, and identification information of this command in association with each other. The server command pool 42 corresponds to a first storage area implemented in the HTTP client 11, and registers a server command, a response to this command, and identification information of this command in association with each other. The client command pool 41 and server command pool 42 are arranged to store a command sheet adapted into a table format for each command, wherein the command and information pertaining to the command such as its identification information and its corresponding response are associated with each other.

The client command generating means 43 corresponds to request generating means. This client command generating means 43 has functions of generating a client command, assigning identification information (ID) for identifying this command, attaching management information for managing this command, and registering in the client command pool 41 the above information in association with each other as a client command sheet in a table format. Generating the client command in the client command generating means 43 may be based on an application program implemented in the HTTP client 11, for example. The client command generating means 43 may have a function of prioritizing the execution of the generated client commands in administering the HTTP server 12 to execute the commands.

FIG. 9 shows an exemplary data configuration of the client command sheet of the HTTP client 11 illustrated in FIG. 8.

As is shown in this drawing, in the client command sheet of the HTTP client 11, areas for storing data corresponding to a 'command ID', a 'method name', an 'input parameter', a 'status', a 'client command execution result notifying destination', and 'output parameter' are provided. Herein, the 'command ID', the 'method name', and the 'input parameter' correspond to the client command (and the ID attached thereto), and the 'status', and the 'client command execution result notifying destination' correspond to the management information. The 'output parameter' corresponds to the content of the command response received from the HTTP server 12.

In the following, a specific description of each of the above items is given.

First, the 'method name' corresponds to the specific content of the request being made to the HTTP server 12, and indicates the type of function to be called at the HTTP server 12. The 'input parameter' corresponds to data accompanying the 'method name', and indicates the argument for calling the function. The 'command ID' corresponds to identification information for identifying the client command. The 'status' corresponds to data indicating the progress of the process relating to the client command, and changes from 'not transmitted'→'waiting for response'→'response received' according to the progress of the process.

When the response to the client command described in the client command sheet is received, this is notified to a module corresponding to the 'client command execution result notifying destination'. The module being referred to as the 'client command execution result notifying destination' usually corresponds to the application program that has generated the client command; however, this is not always the case. As for the 'output parameter', a content of the command response is stored at the time the command response is received. This item is left blank until the command response is received from the HTTP server 12.

Referring back to FIG. 8, the server command execution result generating means 44 corresponding to response generating means is an application program that reads a server command from the server command pool 42. This server command execution result generating means 44 has functions of generating a response to a server command, and registering in the server command pool 42 the generated response to this server command in association with the command ID of this server command. The server command received from the HTTP server 12 is arranged to be stored in the server command pool 42 as a server command sheet in a table format in association with the ID for identifying this command and management information for managing this command. Thus, the command response generated by the server command execution result generating means 44 is also registered in the server command sheet of the corresponding server command.

The server command execution result generating means 44 may be provided with a function of reading a plurality of server commands from the server command pool 42. In the case where the server commands include priority information for the HTTP client 11 to prioritize the execution of their respective processes, the server command execution result generating means 44 may be provided with a function of reading and executing the respective processes according to the order of priority starting, for example, with the server command having the highest priority.

Also, it is noted that the server command execution result generating means 44 may correspond to an application program, or may instead correspond to a module that administers the execution of the command by calling the appropriate application program for executing the server command, for example.

FIG. 10 shows an exemplary data configuration of a server command sheet in the HTTP client 11

As is shown in the drawing, the server command sheet of the HTTP client 11 includes areas for storing data corresponding to a 'command ID', a 'method name', an 'input parameter', a 'status', an 'output parameter', and a 'server command notifying destination'. The 'command ID', the 'method name', and the 'input parameter' correspond to the server command (and ID attached thereto), the 'status' and the 'server command notifying destination' correspond to the management information. The 'output parameter' corresponds to the server command execution result, which indicates the content of the command response that the HTTP client 11 sends back in response to the server command.

In the following, each of the above items is described in greater detail.

First, the 'method name' corresponds to the content of the request being made to the HTTP client 11, and indicates the type of function being called in the HTTP client 11. The 'input parameter' corresponds to accompanying data of the 'method name', and indicates the argument for calling the function. The 'command ID' corresponds to information for identifying the server command. The 'status' corresponds to data indicating the progress of the process pertaining to the server command, and changes from 'not processed'→'process complete'→'response made' according to the progress of the process. The 'output parameter' stores the response generated by the server command execution result generating means 44. This item is left blank until the 'status' reaches 'process complete'. The 'server command notifying destination' corresponds to reference information (e.g., address) of the module realizing the execution of the server command.

Now, referring back to FIG. 8, the outgoing message gathering means 45 corresponds to request gathering means for reading from the server command pool 42 a command response generated by the server command execution result generating means 44 that is registered in association with the command ID of the server command corresponding to this command response, as well as reading from the client command pool 41 a client command generated by the client command generating means 43 that is registered in association with the command ID of this command, and generating an outgoing message from the read data.

When execution priority information is assigned to the command responses and/or the client commands, the outgoing message gathering means 45 may be arranged to read the command responses and/or client commands according to the order of execution priority.

An outgoing message describes a command response or client command and the corresponding command ID as a SOAP message using the XML (extensible Markup Language) format, which is a structured language format. Thus, the outgoing message gathering means 45 generates a SOAP message as an outgoing message for each command response or client command. In such case, the corresponding command ID of each command is described in a SOAP header and the command response or the content of the client command is described in a SOAP body. In a communication using SOAP, a message called SOAP envelope that includes the SOAP header describing the command ID and the SOAP body describing accessory information is described using the XML format and exchanged using a protocol such as HTTP.

The outgoing message gathering means 45 may generate a SOAP message from a command response or client command by implementing an appropriate conversion program (serializer) that is generated based on WSDL (Web Service Description Language), and serializing the read data.

The HTTP request transmitting means 46 corresponds to transmitting means for generating an HTTP request containing the outgoing message generated by the outgoing message gathering means 45, and transmitting the HTTP request to the HTTP server 12. It is noted that any number of outgoing messages may be contained in an HTTP request, and also, outgoing messages corresponding to command responses and outgoing messages corresponding to client commands may be intermingled in the HTTP request on an arbitrary basis.

The HTTP request transmitting means 46 is adapted to include the outgoing messages generated by the outgoing message gathering means 45 in one (or more) HTTP request for transmission to the HTTP server 12 without regard to whether the outgoing messages correspond to a command response or a client command. It is also possible to set a limit to the number of outgoing messages included in one HTTP request, as will be appreciated.

It is noted that once the outgoing message gathering means 45 undertakes reading a client command or command response, the transmission of the HTTP request is performed even when there is no data to be read and consequently no outgoing messages are generated. That is, the outgoing message gathering means 45 periodically makes an attempt to read a command response or client command. For example, the readout operation may be performed every 60 minutes based on a timer.

The above arrangement is made because the HTTP server 12 is unable to send information to the HTTP client 11 unless the HTTP client 11 makes a communication request to the HTTP server 12 as described earlier. Thus, even when there is no data to be sent from the HTTP client 11, the HTTP client 11 is arranged to periodically send a communication request to the HTTP server 12 to give the HTTP server 12 an opportunity to send information to the HTTP client 11 so that information to be transmitted to the HTTP client 11 is prevented from remaining in the HTTP server 12 over a long period of time.

It is noted that the outgoing message gathering means 45 is able to perform the readout operation at a suitable timing aside from the designated periodic readout timing. For example, when information requiring urgent transmission is registered in one of the client command pool 41 or server command pool 42, the client command generating means 43 or the server command execution result generating means 44 may notify this to the outgoing message gathering means 45 so that the information can be readout.

The HTTP response receiving means 47 corresponds to receiving means for acquiring an HTTP response from the HTTP server 12. In the HTTP response, any number of receiving messages may be included. The receiving message may describe a server command and the command ID associated with this command or a response to a client command and the command ID associated with this command, and the two types of receiving messages may be intermingled in the HTTP response as necessary or desired on an arbitrary basis.

The receiving message describes the command or response and the corresponding command 1D as a SOAP message.

The received message distributing means 48 corresponds to distributing means for allocating and registering the data contained in the HTTP response received by the HTTP response receiving means 47 into the server command pool 42 and client command pool 41, respectively.

The server command and the command ID associated with this command are registered in a server command sheet provided in the server command pool 42. As for the response to a client command, the command ID associated with this command is collated with the command ID of each client command sheet stored in the client command pool 41 so as to determine the corresponding client command of the command response, and this command response is registered as the 'output parameter' of the corresponding client command.

The HTTP response is resolved into the respective receiving messages, and each receiving message included in this HTTP response is extracted so that data described therein is converted into a format suitable for registration in the table. This conversion may be realized by implementing an appropriate conversion program (parser) that is generated based on WSDL.

FIG. 11 shows an example of an HTTP request that is to be transmitted to the HTTP server 12 by the HTTP client 11 having the above-described functions.

As is shown in the drawing, this HTTP request has a body portion that describes a multipart message using MIME (Multipurpose Internet Mail Extension). In each part making up the multipart message an entity header is described and a SOAP message is embedded. In the example of FIG. 11, the HTTP body of the HTTP request is made up of independent parts 1~4 that are divided from each other by a 'MIME-_boundary'; however, it is noted that the number of parts described in an HTTP body is not limited to four, and any number of parts (including 0) may be described.

It is also noted that the SOAP envelope embedded in the HTTP request to be transmitted to the HTTP server 12 may describe a client command or a response to a server command.

FIG. 12 shows an example of an HTTP response received by the HTTP client 11 from the HTTP server 12.

As is shown in the drawing, the structure of the HTTP response is identical to that of the HTTP request shown in FIG. 11 except for the HTTP header. The body portion of the HTTP response is identical to the HTTP request and describes SOAP envelopes of a multipart message that is in accordance with MIME. It is noted that the content of the SOAP envelope varies depending on the content of the command or command response being described.

It is noted that the SOAP envelope embedded in the HTTP response to be transmitted to the HTTP client 11 may describe a server command or a response to a client command.

In the following, specific examples of the parts in the HTTP request or HTTP response are described with reference to FIGS. 13~16.

FIG. 13 shows an example of a part describing a client command.

In this example, 'SOAPAction' described in the entity header portion indicates that the data described in this part corresponds to a SOAP envelope describing a command. 'X-SOAP-Type: Request' also indicates this information. Also, a URI (Uniform Resource Identifier) described after 'SOAPAction' includes the word 'server' so as to indicate that the data described in this part corresponds to a SOAP envelope describing a command to a server, namely, a client command.

Under the <Envelope> tag, addresses defining namespaces are indicated as attributes of the 'Envelope' tag. Also, in this example, unique namespaces are defined in addresses 'http://www.foo.com/header' and 'http://www.foo.com/server' in addition to the namespaces defined as the norm in SOAP. Thus, a namespace prefix 'n' attached to an XML tag indicates that the address 'http://www.foo.com/header' is to be referred to, and a namespace prefix 'ns' attached to an XML tag indicates that the address 'http://www.foo.com/server' is to be referred to in acquiring the structures of these XML tags and definitions of data to be transferred.

In the 'SOAP header', '12345' corresponding to the ID of this client command is described as the content of the 'request ID' XML tag. In the 'SOAP body', a 'trouble notification' tag is described as information indicating the method stored in the 'method name' of the client command sheet, and the argument and other information stored in the 'input parameter' of the client command sheet are described as elements of subordinate tags such as an 'error ID' tag and a 'description tag'. In this example, the notification content of the trouble notification is described.

FIG. 14 shows an example of a part describing a response to a client command.

In this example, 'X-SOAP-Type: Response' is described in the entity header portion to indicate that the data described in this part corresponds to a SOAP envelope describing a command response.

The definitions of namespaces in this example are identical to those of the previous example shown in FIG. 13. Further, in the 'SOAP header', '12345' corresponding to the ID of the client command to which the response has been generated is described as the content of the 'command ID' XML tag. In the 'SOAP body', a 'trouble notification Response' tag for indicating that the part describes a response to the 'trouble notification' command is described, and the content of the command response is described in a subordinate tag and its tag element. In this example, information indicating the fact that the trouble notification has been properly received is described.

FIG. 15 shows an example of a part describing a server command.

As in the example of FIG. 13, the information 'SOAPAction' and 'X-SOAP-Type: Request' described in the entity header portion of this part indicates that the data described in this part corresponds to a SOAP envelope describing a command. In this example, a URI (Uniform Resource Identifier) described after 'SOAPAction' includes the word 'client' indicating that the data described in this part corresponds to a SOAP envelope describing a command to a client, namely, a server command.

Under the <Envelope> tag, addresses defining namespaces are indicated as attributes of the 'Envelope' tag, and in this example, unique namespaces are defined in addresses 'http://www.foo.com/header' and 'http://www.foo.com/client' in addition to the namespaces defined as the norm in SOAP.

In the 'SOAP header', '98765' corresponding to the ID of this server command is described as the content of the 'command ID' XML tag. Also, in the SOAP body, a 'temperature sensor value acquisition' tag is described as information indicating the method stored in the 'method name' of the server command sheet, and the argument or some other information stored in the 'input parameter' of the server command sheet is described as an element of a subordinate tag 'sensor ID'. In this example, the ID of the sensor from which the sensor value is to be acquired is described Further, it is noted that the server may send such a command to the client when it receives a trouble notification from the client, for example, in which case the server may try to determine the cause of the trouble.

FIG. 16 shows an example of a part describing a response to a server command.

As in the example of FIG. 14, 'X-SOAP-Type: Response' is described in the entity header portion of this part to indicate that the data described in this part corresponds to a SOAP envelope describing a command response.

Also, as in the example of FIG. 15, '98765' corresponding to the ID of the server command to which this response is generated is described in the 'SOAP header' of this part as the content of the 'command ID' XML tag. In the SOAP body, a 'temperature sensor value acquisition Response' tag indicating that the part indicates the response to the 'temperature sensor value acquisition' command is described, and the content of the server command response is described in a subordinate tag and its tag element. In this example, temperature value information provided by the sensor to which the value acquisition request has been made is described.

In the following, processes performed by the HTTP client 11 having the above-described configurations and functions are described with reference to flowcharts shown in FIGS. 17~21. It is noted that the processes illustrated in these flowcharts may be realized by the CPU 31, for example, which executes the appropriate control programs, as will be appreciated.

Figure 17:
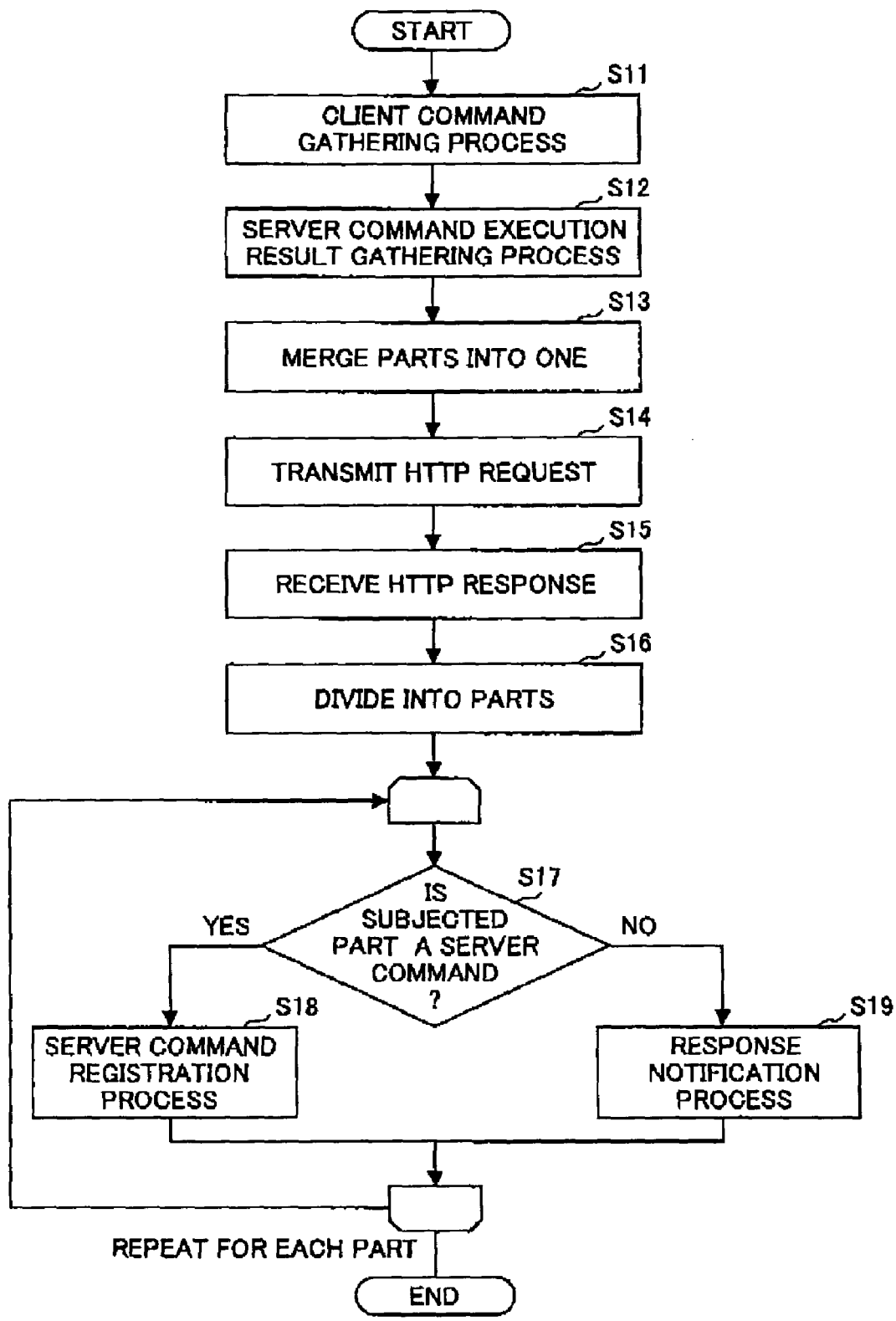
FIG. 17 is a flowchart illustrating a basic operation flow of a message gathering and distributing process performed in the HTTP client of FIG. 3.

First of all, FIG. 17 shows a flowchart illustrating a basic operation flow of a message gathering and distributing process.

The CPU 31 of the HTTP client 11 starts the process illustrated by the flowchart of FIG. 17 when it is time for the outgoing message gathering means 45 to undertake readout of a client command and/or command response.

According to this process flow, first, a client command gathering process is performed (S11). This corresponds to a process of gathering from the client command pool 41 client commands that are to be transmitted to the HTTP server 12, and also includes a process of generating from the gathered data parts containing respective SOAP envelopes Next, a server command execution result gathering process is performed (S12). This corresponds to a process of gathering from the server command pool 42 command responses that are to be transmitted to the HTTP server 12, and also includes a process of generating from the gathered data parts containing respective SOAP envelopes Then, the parts generated in the processes of steps S11 and S12 are merged so that an HTTP request containing these parts is generated (S13). This HTTP request is then sent to the HTTP server 12 (S14).

With regard to the processes up to this point, the CPU 31 functions as the outgoing message gathering means 45 in steps S11 and S12, and as the HTTP request transmitting means 46 in steps S13 and S14.

Next, an HTTP response as a communication response to the HTTP request is received from the HTTP server 12 (S15). Then, the HTTP body of the received HTTP response is divided into parts (S16). This corresponds to a process of dividing the HTTP body into components that are separated from each other by a 'MIME_boundary'.

Then, a sequence of processes corresponding to steps S17-S19 is successively performed for each of the divided parts. In this process sequence, first, it is determined whether a part subjected to the process describes a server command (S17). Then, if it is determined that the part describes a server command, a server command registration process is performed (S18). If it is determined that the part does not describe a server command, this means that the part describes a response to a client command and, thereby, a response notification process is performed (S19).

After performing either step S18 or S19, the process goes back to step S17, and the process sequence is repeated for a next part that is subjected to the process. Thus, the process sequence of steps S17-S19 is performed for each of the divided parts, and the process flow shown in FIG. 17 ends when this is completed.

With regard to the processes up this point, the CPU 31 functions as the HTTP response receiving means 47 in steps S15 and S16, and as the received message distribution means 48 in steps S17~S19.

In the following, the operation flow of FIG. 17 is described further using flowcharts each illustrating portions of the operation flow in greater detail.

Figure 18:
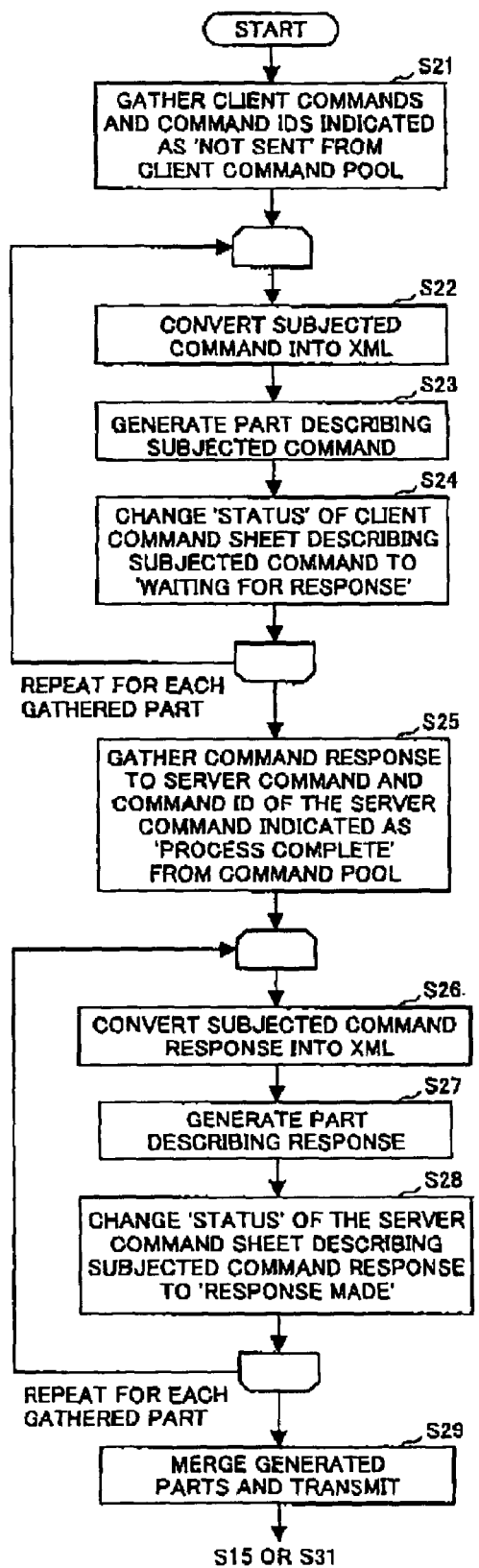
FIG. 18 is a flowchart illustrating a more detailed process flow of steps S11-S14 of FIG. 17.

FIG. 18 is a flowchart illustrating a more detailed process flow of steps S11~S14 in FIG. 17.

According to this process flow, first, the CPU 31 of the HTTP client 11 gathers from the client command pool 41 contents of the 'method name' and 'input parameter' of the client command sheets indicating 'not sent' for the 'status' as client commands to be sent to the HTTP server 12, and also gathers contents of the 'command ID' as IDs of the gathered client commands (S21). It is noted that when 'not sent' is indicated as the 'status', this means that a command generated by the client command generating means 43 has not yet been sent to the HTTP server 12. Thus, commands to be sent to the HTTP server 12 can be extracted based on this information.

Then, a process sequence corresponding to steps S22~S24 is successively performed on each of the client commands gathered in step S21. In this process sequence, first, a client command and its corresponding command ID that are subjected to the process are converted into an XML text in which information on the client command and the command ID are included in a SOAP body and a SOAP header, respectively (S22). Accessory information is attached to the XML text to generate a SOAP envelope corresponding to a part describing the subjected command (S23). Then, the 'status' of the client command sheet describing the subjected client command is changed from 'not sent' to 'waiting for response' (S24). When the 'status' of the client command sheet is indicated as 'waiting for response', this means that the described command has been sent to the HTTP server 12.

After the process sequence is performed on each of the gathered client commands, the CPU 31 gathers the contents of the 'output parameter' of server command sheets of which the 'status' is indicated as 'process complete' as command responses to server commands that are to be transmitted to the HTTP server 12, and also gathers the contents of the 'command ID' as IDs of the server commands corresponding to the gathered responses (S25). When the 'status' is indicated as 'process complete', this means that the response corresponding to the server command that is generated by the server command execution result generating means 44 has not yet been sent to the HTTP server 12. Thus, the command responses to be transmitted to the HTTP server 12 can be extracted based on this information.

Then, a process sequence corresponding to steps S26~S28 is successively performed on each of the command responses gathered in step S25. This process sequence includes converting a subjected command response and the corresponding command ID gathered therewith into an XML text that describes information on this command response and the corresponding command ID in a SOAP body and a SOAP header, respectively (S26), attaching accessory information to the XML text and generating a SOAP envelope corresponding to a part describing the subjected command response (S27). This process sequence is identical to that of steps S22 and S23 except for the difference in the data items being subjected to the processes. Next, the 'status' of the server command sheet describing the subjected command response is changed to 'response made' (S28). When 'response made' is indicated as the 'status', this means that the command response has been sent to the HTTP server 12.

After the completion of the processes described above, the CPU 31 merges the parts generated in steps S23 and S27, generates a multipart HTTP request as shown in FIG. 11, and sends this to the HTTP server 12 (S29).

It is noted that the changing of the 'status' in steps S24 and S28 may be performed after the transmission of data is actually completed.

In this way, the processes pertaining to the transmission of the HTTP request are completed, and the operation moves on to steps S15 of FIG. 17.

Figure 19:
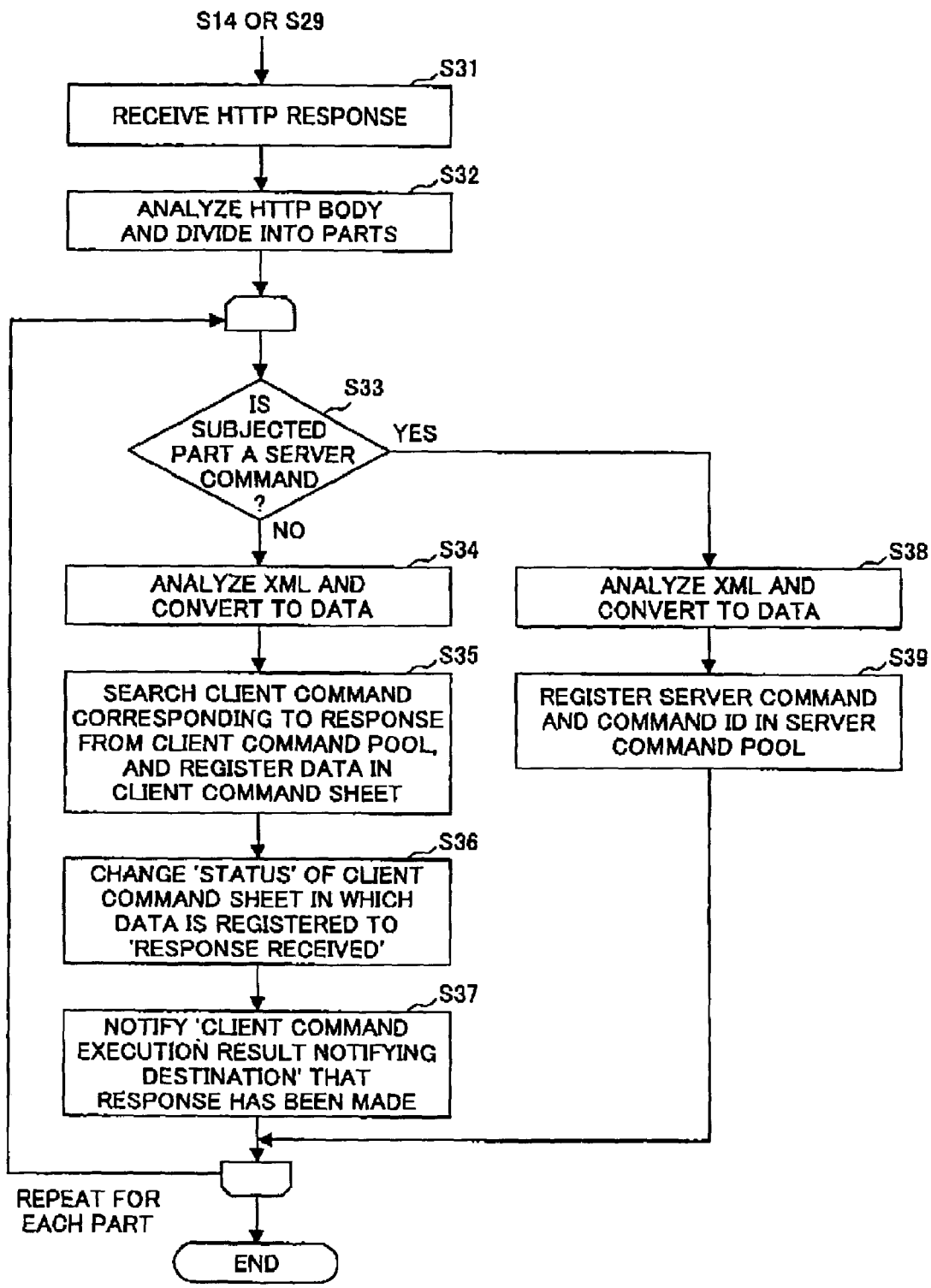
FIG. 19 is a flowchart illustrating a more detailed operation flow of the process steps S15 and onward of FIG. 17.

FIG. 19 is a flowchart illustrating a more detailed operation flow of FIG. 17 for the processes of steps S15 and onward. The process step following step S29 of FIG. 18 corresponds to step S31 in this drawing.

According to this process flow, first, the CPU 31 of the HTTP client 11 awaits the arrival of an HTTP response to the transmitted HTTP request, and then receives the HTTP response from the HTTP server 12 (S31). Upon receiving the HTTP response, the CPU 31 analyzes its HTTP body and divides it into parts (S32).

Then, a process sequence corresponding to steps S33~S39 is successively performed on each of the divided parts.

In this process sequence, first, it is determined whether a part subjected to the process corresponds to a server command (S33). As is described above, a server command and a response to a client command may be included in the HTTP response and, thus, a determination of whether a part corresponds to a server command or a response to a client command is made. This determination is made based on whether a 'SOAPAction' header is described in the part, or the determination may be made based on the content of the 'X-SOAP-Type' header.

Then, when it is determined in step S33 that the part does not correspond to a server command, this means that the part describes a response to a client command. In this case, the XML text describing the part is analyzed and converted into data suitable for registration in the client command sheet (S34). Then, a client command corresponding to this response is searched from the client command pool 41, and the command response data is registered in the item 'output parameter' of the client command sheet of the corresponding client command (S35). It is noted that a command ID identical to the information indicated as the 'command ID' in the transmitted client command is attached to the command response and, thus, the search for the client command in step S35 may be conducted using this information as a key.

After the registration of the command response data is completed the 'status' of the client command sheet is changed to 'response received' (S36). Then, the fact that a response has been received is notified to a destination registered in the 'client command execution result notifying destination' (S37). With this notification, an application program such as that for generating the client command may be informed that a response to the generated command has been received, and may perform the appropriate processes according to the response.

For example, when an application program for generating a trouble notification generates a client command to send a trouble notification to the HTTP server 12, this command is sent to the HTTP server 12, and the HTTP server 12 may send back a command response indicating that the command has been properly received. Then, the HTTP client 11 receiving this command response may search the client command corresponding to this command response based on the command ID included in the received command response, and register this command response in association with the searched out client command. Then, the application program for generating the trouble notification that is registered as the command execution result notifying destination of this command is notified of the fact that a response to this command has been received. The application program for receiving this notification may refer to the client command sheet and acquire the execution result of the generated command from the item 'output parameter' of this client command sheet.

After the processes up to step S37 are completed for the subjected part, the same processes starting from step S33 are repeated for a next part if such part exists.

On the other hand, when it is determined in step S33 that the subjected part corresponds to a server command, the XML text describing the part is analyzed and converted into data suitable for registration in the server command sheet (S38). Then a server command sheet for this server command is created and this server command sheet containing the server command and its corresponding command ID is registered in the server command pool 42 (S39). The content of the server command is registered in the items 'method name' and 'input parameter' of the server command sheet, and the command ID described in the part is registered in the item 'command ID' of the server command sheet. In the item 'server command notifying destination', reference information to the application program with which the method registered in the 'method name' is executed, for example, is registered, this reference information being determined based on correspondence information between a method and an application program, for example, that is provided beforehand. It is noted that the initial value of the 'status' corresponds to 'not processed', and the initial value of the 'output parameter' corresponds to 'NULL'.

After the processes up to step S39 are completed for the subjected part, the same processes starting from step S33 are repeated for a next part if such part exists.

Thus, the process flow illustrated in FIG. 19 ends after the process sequence from step S33 to step S39 is performed on each of the parts contained in the HTTP response received in step S31.

By performing the above-described processes, the HTTP client 11 is able to send to the HTTP server 12 an operation request to be transmitted to the HTTP server 12 together with an operation response to an operation request received from the HTTP server 12 in one bundle. Also, the HTTP client 11 is able to receive from the HTTP server 12 an operation request sent by the HTTP server 12 together with an operation response to the operation request that has been sent to the HTTP server 12 in one bundle.

It is noted that in the present embodiment, the parts to be transmitted are generated and merged together before they are transmitted, and the parts are received as a whole after which they are divided into parts for further processing; however, it will be appreciated that the present invention is not limited to this arrangement.

For example, in the transmission stage, the HTTP header may first be transmitted, after which the ensuing parts are successively transmitted each time they are generated, and notification data may be sent after the transmission of the parts is completed. Even in such arrangement, as long as the data transmitted during this stage correspond to a logical succession of data belonging to one HTTP request having one HTTP header, the transfer of data can be realized in one session with one negotiation process. Thus, an effect similar to that from merging the parts together before transmitting the HTTP request can be obtained in this embodiment as well. Further, since the required memory capacity of the buffer for storing data to be transmitted can be reduced in this embodiment, a low cost communication apparatus can be arranged to handle a large quantity of data.

Also, at the receiving side, the processes for each part may be successively performed each time a part is received. As in the transmission, the required memory capacity can be reduced according to this embodiment.

In the following, processes pertaining to the execution of a server command will be described.

Figure 20:
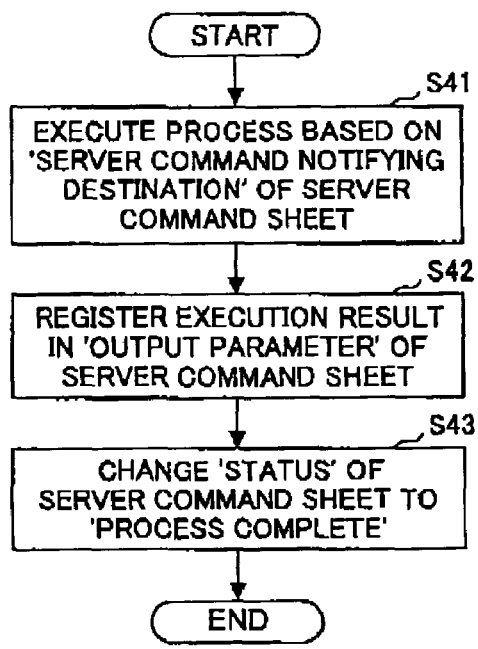
FIG. 20 is a flowchart illustrating an exemplary process flow pertaining to the execution of a server command that is performed in the HTTP client shown in FIG. 3.

FIG. 20 is a flowchart illustrating an example of such processes.

The process steps of FIG. 20 pertaining to the execution of a server command are performed after step S39 of FIG. 19. Namely, these steps may be performed after the server command is registered in the server command pool 42. Herein, the CPU 31 of the HTTP client 11 functions as the server command execution result generating means 44.

In this process flow, first, an application program or some other suitable means for executing the server command is called based on the information corresponding to the 'server command notifying destination' of the server command sheet describing the registered server command, and data corresponding to the 'method name' and 'input parameter' are transferred to the application program so that a process pertaining to the server command is performed (S41). Although it is not shown in this flowchart, the process pertaining to the server command is executed by the CPU 31 using a different thread.

After this process step is completed, the execution result is registered in the item 'output parameter' of the server command sheet (S42). At the same time, the 'status' of the server command sheet is changed to 'process complete' which indicates that the process is completed (S43). Then, the operation goes back to the process flow of FIG. 19, namely, to step S33, if appropriate, or to end the operation of the HTTP client 11.

By means of the process steps of FIG. 20, the server command may be executed and appropriate measures may be taken so that the execution result of the server command can be sent to the HTTP server 12 as the command response.

Figure 21:
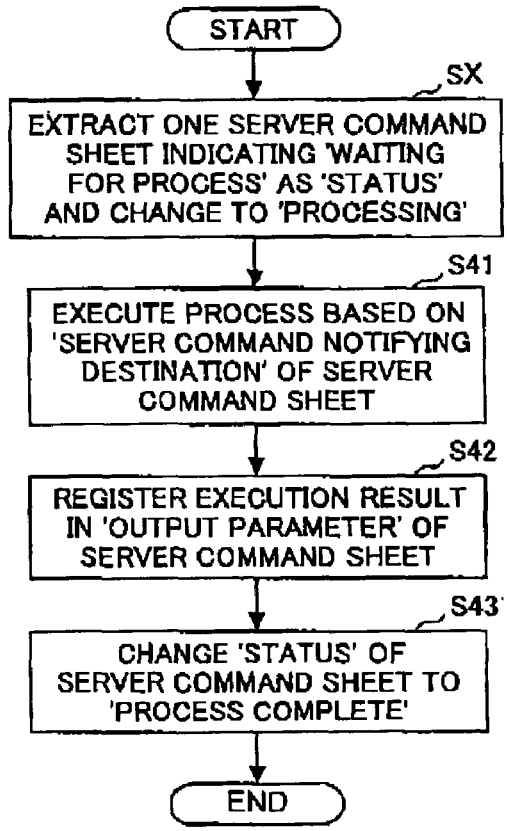
FIG. 21 is a flowchart illustrating another exemplary process flow pertaining to the execution of the server command.

FIG. 21 is a flowchart illustrating another exemplary process flow pertaining to the execution of the server command that is performed independently from the process flow of FIG. 19. Herein, the CPU 31 of the HTTP client 11 also functions as the server command execution result generating means 44 as in the example of FIG. 20.

In performing the process steps of FIG. 21, the CPU 31 initiates the process at suitable timings such as at intervals of a predetermined time period or after a predetermined time period passes from the time an HTTP response is received.

When the process of FIG. 21 is started, a server command sheet of which the 'status' is indicated as 'waiting for process' is extracted from the server command pool 42 to be subjected to the subsequent processes, and the 'status' of its command sheet is changed to 'processing' (SX). Although it is not shown, if a server command sheet of which the 'status' is indicated as 'waiting for process' is not found in the server command pool 42, the process of FIG. 21 is ended.

When a server command sheet qualifying for the process can be found, the process steps S41~S43 are performed as in FIG. 20 to execute the server command described in the subjected server command sheet, and the process ends after these steps are completed.

It is noted that the above processes may be performed simultaneously using a plurality of threads (e.g., four threads). Herein, since the 'status' of a server command sheet that is once subjected to the process is no longer indicated as 'waiting for process', the server command sheet is prevented from being subjected to a process more than once even when a new process is started before a previous process is completed.

By performing the above-described processes, each server command can be executed at a desired timing and, thereby, even when the execution of one command takes a long time, its subsequent processes (server commands) may not necessarily be affected by this delay. Further, the execution results of the server commands are successively adjusted for transmission to the HTTP server 12 as command responses according to the order in which the execution of each command is completed.

In the above, the processes pertaining to the transfer of commands and command responses performed in the HTTP client 11 has been described.

A functional configuration of the HTTP server 12 will now be described. Herein, it is noted that a hardware configuration of the HTTP server 12 may be identical to that of the HTTP client 11 as described using FIG. 7; Thereby, in the flowing descriptions of the HTTP server 12, numerical references for hardware components are identical to those for the HTTP client 11.

FIG. 22 is a block diagram illustrating an exemplary functional configuration of the HTTP server 12 for performing processes pertaining to the transfer of commands and command responses.

Of the functions shown in FIG. 22, a server command pool 141 and a client command pool 142 are implemented in any suitable rewritable storage means of the HTTP server 12. Server command generating means 143, client command execution result generating means 144, outgoing message gathering means 145, and received message distributing means 148 are realized by the CPU 31. Also, HTTP response transmitting means 146 and HTTP request receiving means 147 are realized by the CPU 31 and the NIC 35.

In the following, further details of the above functions are described.

First, the server command pool 141 corresponds to a second storage area implemented in the HTTP server 12, and registers a server command, a response to this command, and identification information of this command in association with each other. Also, the client command pool 142 corresponds to a first storage area implemented in the HTTP server 12, and registers a client command, a response to this command, and identification information of this command in association with each other.

The server command generating means 143 corresponds to request generating means for generating a server command, assigning identification information (ID) for identifying this command, attaching management information for managing this command, and registering in the server command pool 141 the above data in association with each other as a client command sheet in a table format. Further, generating the client command in the client command generating means 43 may be realized by an application program implemented in the HTTP server 12, for example. Also, the server command generating means 143 may have a function of prioritizing the execution of the generated server commands in administering the HTTP client 11 to execute the commands.

FIG. 23 shows an exemplary data configuration of the server command sheet of the HTTP server 12.

As is shown in this drawing, the server command sheet of the HTTP server 12 has areas for storing data that are largely identical to those of the client command sheet of the HTTP client 11 shown in FIG. 9. The difference between these two command sheets lies in the fact that the type of command described in the server command sheet of the HTTP server 12 is a server command rather than a client command and the HTTP client 11 is designated as the destination of this command and the sender of its corresponding command response. Further, as for the 'server command execution result notifying destination' of the server command sheet of the HTTP server 12, although the title of this item is different since the command sheet describes a server command rather than a client command, the actual contents that may be registered as data for this item are identical to those for the 'client command execution result notifying destination' of FIG. 9.

Referring back to FIG. 22, the client command execution result generating means 144 corresponding to response generating means is an application program for reading a client command from the client command pool 142. This client command execution result generating means 144 has functions of generating a response to a client command, and registering in the client command pool 142 the generated response to this client command in association with the command 1D of this command. Herein, it is noted that the client command received from the HTTP client 11 is arranged to be registered in association with the ID for identifying this command and management information for managing this command in the client command pool 142 as a client command sheet in a table format. Thus, the command response generated by the client command execution result generating means 144 is also registered in the client command sheet of the corresponding client command.

The client command execution result generating means 144 may be provided with a function of reading a plurality of client commands from the client command pool 142 and generating a response for each of the readout client commands. Further, in the case where the client commands include priority information for the HTTP server 12 to prioritize the execution of their respective processes, the client command execution result generating means 144 may be provided with a function of reading and executing the respective processes according to the order of priority starting with the client command with the highest priority.

It is noted that the client command execution result generating means 144 does not necessarily have to be an application program itself, and may instead be a module that administers the execution of a command by calling a suitable application program for executing the server command, for example.

FIG. 24 shows an exemplary data configuration of a client command sheet in the HTTP server 12.

As is shown in this drawing, the client command sheet of the HTTP server 12 has areas for storing data that are largely identical to those of the server command sheet of the HTTP client 11 shown in FIG. 10. The difference between these two command sheets is that the type of command described in this client command sheet of the HTTP server 12 is a client command rather than a server command and the HTTP client 11 is designated as the sender of this command and the destination of its corresponding command response. Further, as for the 'client command notifying destination' of the server command sheet of the HTTP server 12, although the title of this item is different since the command sheet describes a client command rather than a server command, the actual contents that may be registered as data for this item are identical to those for the 'server command notifying destination' of FIG. 10.

Referring back to FIG. 22, the outgoing message gathering means 145 corresponds to request gathering means for reading from the client command pool 142 a command response generated by the client command execution result generating means 144 that is registered in association with the command ID of the client command corresponding to this command response, as well as reading from the server command pool 141 a server command generated by the server command generating means 143 that is registered in association with the command ID of this command, and generating an outgoing message from the read data.

When execution priority information is assigned to the command responses and/or the client commands, the outgoing message gathering means 145 may be arranged to read the command responses and/or client commands according to the order of execution priority.

Herein, the format of the outgoing message created by the outgoing message gathering means 145 of the HTTP server 12 is identical to that of the outgoing message treated in the HTTP client 11.

The HTTP response transmitting means 146 corresponds to transmitting means for generating an HTTP request containing the outgoing message generated by the outgoing message gathering means 145 as a communication response to the HTTP request received from the HTTP client 11, and transmitting this HTTP response to the HTTP client 11. Herein, it is noted that any suitable number of outgoing messages may be contained in an HTTP response, and also, outgoing messages corresponding to command responses and outgoing messages corresponding to client commands may be intermingled in the HTTP response on an arbitrary basis.

Thus, the HTTP response transmitting means 146 is adapted to include the outgoing messages generated by the outgoing message gathering means 145 in one HTTP request for transmission to the HTTP client 11 without regard to whether the outgoing messages contained therein correspond to a command response or a client command. However, it is also possible to set a limit to the number of outgoing messages included in one HTTP request.

It is noted that once the outgoing message gathering means 145 undertakes reading of a server command or command response, the transmission of the HTTP response is performed even when there is no data to be read and consequently no outgoing messages are generated. That is, the outgoing message gathering means 145 undertakes readout of a command response or server command upon receiving an HTTP request from the HTTP client 11.

The above arrangement is made because the HTTP server 12 is unable to send information to the HTTP client 11 unless the HTTP client 11 makes a communication request to the HTTP server 12 as described earlier.

The HTTP request receiving means 147 corresponds to receiving means for acquiring an HTTP request from the HTTP client 11. In the HTTP request, any number of receiving messages may be included. Further, the receiving message may describe a client command and the command ID associated with this command or a response to a server command and the command ID associated with this command, and the two types of receiving messages may be intermingled in the HTTP request on an arbitrary basis.

Herein, the receiving message describes the command or response and the corresponding command ID as a SOAP message.

The received message distributing means 148 corresponds to distributing means for allocating and registering the data contained in the HTTP request received by the HTTP request receiving means 147 into the server command pool 141 and the client command pool 142, respectively.

Specifically, the client command and the command ID associated with this command are registered in a client command sheet provided in the client command pool 142. As for the response to a server command, the command ID associated with this command is collated with the command ID registered in each server command sheet stored in the server command pool 141 so as to determine the corresponding server command of the command response, and this command response is registered as the 'output parameter' of the corresponding server command.

The HTTP request is resolved into the respective receiving messages, and each receiving message included in this HTTP response is extracted so that data described therein is converted into a format suitable for registration in the table. This conversion may be realized by implementing an appropriate conversion program (parser) that is generated based on WSDL.

The HTTP request received by the HTTP server 12 having the above-described functions corresponds to a communication request sent from the HTTP client 11. Thus, for example, this HTTP request may correspond to the HTTP request of FIG. 11 used in describing the functions of the HTTP client 11. Similarly, the HTTP response sent by the HTTP server 12 corresponds to the communication response sent to the HTTP client 11 to be received by this HTTP client 11. Thus, for example, this HTTP response may correspond to that described using FIG. 12. Further, the contents of the parts included in the HTTP request and HTTP response may be identical to those described in reference to FIGS. 13~16.

In the following, processes performed by the HTTP server 12 having the above-described configurations and functions are described with reference to flowcharts shown in FIGS. 25~29. Herein, it is noted that the processes illustrated in these flowcharts are realized by the CPU 31 of the HTTP server 12 that executes the appropriate control programs.

First of all, FIG. 25 shows a flowchart illustrating a basic operation flow of a message gathering and distributing process.

The CPU 31 of the HTTP server 12 starts the process illustrated by the flowchart of FIG. 25 when an HTTP request is sent from the HTTP client 11.

According to this process flow, first the HTTP request is received (S111). Then, the HTTP body of the received HTTP request is divided into parts (S112). The HTTP body is divided into components that are separated from each other by a 'MIME_boundary'.

Then, a sequence of processes corresponding to steps S113~S115 is successively performed for each of the divided parts. In this process sequence, first, it is determined whether a part subjected to the process describes a client command (S113). Then, if it is determined that the part describes a client command, a client command registration process is performed (S114). On the other hand, if it is determined that the part does not describe a client command, this means that the part describes a response to a server command and, thereby, a response notification process is performed (S115).

After performing either step S114 or S115, the process goes back to step S113, and the process sequence is repeated for a next part that is subjected to the process. Then, after the process sequence of steps S113~S115 is performed for each of the divided parts, the process moves on to the next step S116.

With regard to the processes up this point, the CPU 31 functions as the HTTP request receiving means 147 in steps S111 and S112, and as the received message distribution means 148 in steps S113~S115.

Next, the CPU 31 performs a server command gathering process (S116). This corresponds to a process of gathering from the server command pool 142 server commands that are to be transmitted to the HTTP client 11, and also includes a process of generating from the gathered data parts containing respective SOAP envelopes.

Next, a client command execution result gathering process is performed (S117). This corresponds to a process of gathering from the client command pool 142 command responses that are to be transmitted to the HTTP client, and also includes a process of generating from the gathered data parts containing respective SOAP envelopes.

Then, the parts generated in the process steps S116 and S117 are merged together so that an HTTP response containing these parts is generated (S118). This HTTP response is then sent to the HTTP client 11 as a communication response to the HTTP request received in step S111 (S119), after which this message gathering and distributing process is completed.

With regard to the processes up to this point, the CPU 31 functions as the outgoing message gathering means 145 in steps S116 and S117, and as the HTTP response transmitting means 146 in steps S118 and S119.

In the following, the operation flow of FIG. 25 is described further using flowcharts each illustrating portions of the operation flow in greater detail.

Figure 26:
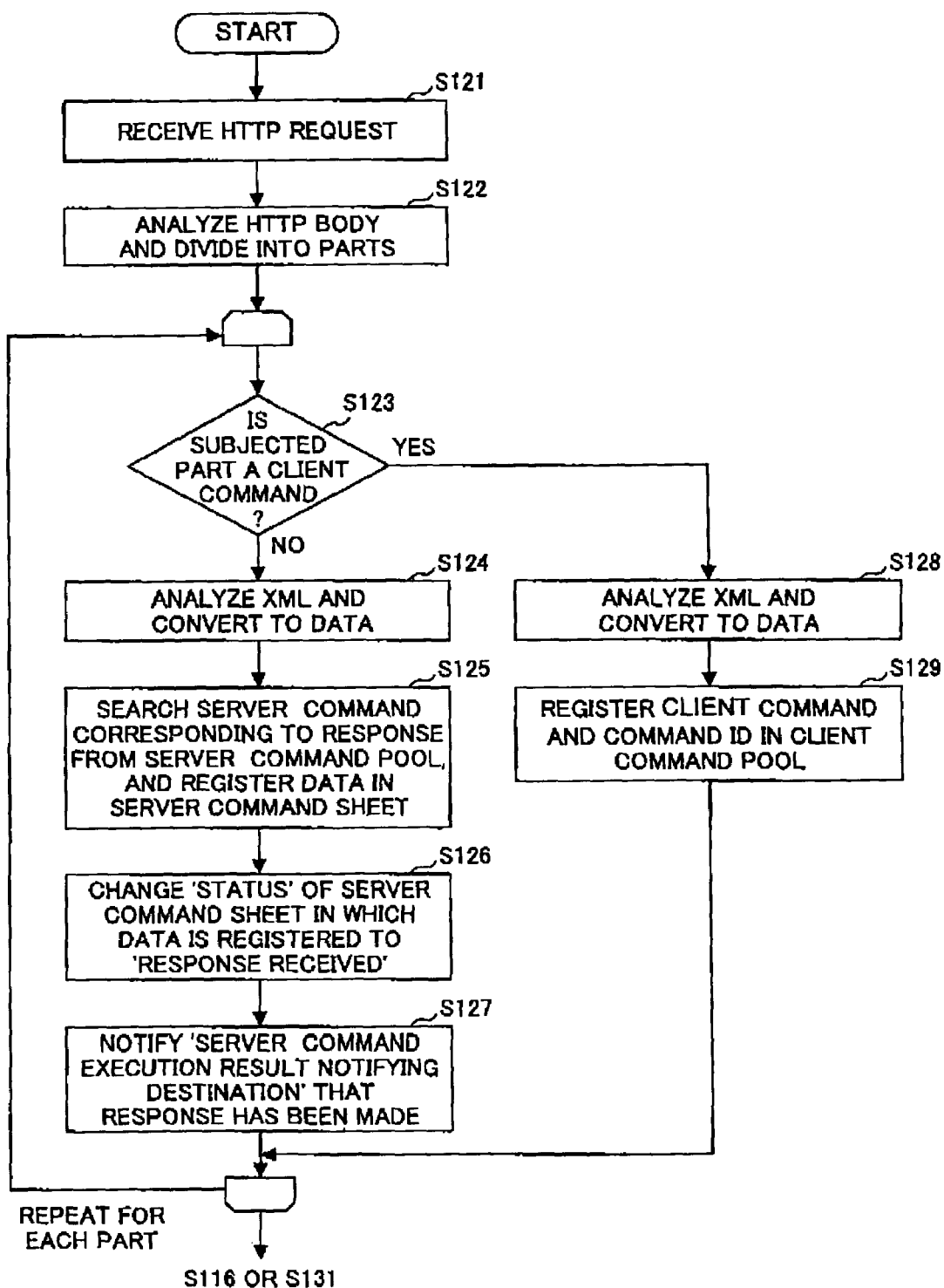
FIG. 26 is a flowchart illustrating a more detailed operation flow of the process steps S111~115 in FIG. 25.

FIG. 26 is a flowchart illustrating a more detailed operation flow of FIG. 25 for the process steps S111~S115.

According to this process flow, first, the CPU 31 of the HTTP server 12 receives the HTTP request transmitted from the HTTP client 11 (S121). Upon receiving the HTTP request, the CPU 31 analyzes its HTTP body and divides it into parts (S122).

Then, a process sequence corresponding to steps S123~S129 is successively performed on each of the divided parts.

In this process sequence, first, it is determined whether a part subjected to the process corresponds to a client command (S123). As is described above, a client command and a response to a server command may be included in the HTTP request and, thus, a determination of whether a part corresponds to a client command or a response to a server command is made. This determination is made based on whether a 'SOAPAction' header is described in the part, or the determination may be made based on the content of the 'X-SOAP-Type' header.

Then, when it is determined in step S123 that the part does not correspond to a client command, this means that the part describes a response to a server command. In this case, the XML text describing the part is analyzed and converted into data suitable for registration in the server command sheet (S124). Then, a server command corresponding to this response is searched from the server command pool 141, and the command response data is registered in the item 'output parameter' of the server command sheet of the corresponding server command (S125). It is noted that a command ID identical to the information indicated as the 'command ID' in the transmitted server command is attached to the command response and, thus, the search for the corresponding server command in step S125 may be conducted using this information as a key.

After the registration of the command response data is completed, the 'status' of the server command sheet is changed to 'response received' and indicated as thus (S126). Then, the fact that a response has been received is notified to a destination registered in the 'server command execution result notifying destination' (S127). With this notification, an application program such as that for generating the server command may be informed that a response to the generated command has been received, and may perform suitable processes according to the response.

For example, when an application program for dealing with trouble arising in the HTTP client 11 generates a server command to acquire a sensor value from a temperature sensor of the HTTP client 11, this command is sent to the HTTP client, and the HTTP client 11 may send back a command response including the requested sensor value. Then, the HTTP server 12 receiving this command response searches for the server command corresponding to this command response based on the command ID included in this command response, and registers this command response in association with its corresponding server command. Then, the application for dealing with the trouble that is registered as the command execution result notifying destination of this command is notified of the fact that a response to this command has been received. The application program receiving this notification may refer to the server command sheet and acquire the execution result of the generated command from the item 'output parameter' of this server command sheet.

After the processes up to step S127 are completed for the subjected part, the same processes starting from step S123 are repeated for a next part if such part exists.

On the other hand, when it is determined in step S123 that the subjected part corresponds to a client command, the XML text describing the part is analyzed and converted into data suitable for registration in the client command sheet (S128). Then, a client command sheet for this client command is created and this server command sheet containing the server command and its corresponding command ID is registered in the client command pool 142 (S129). The content of the client command is registered in the items 'method name' and 'input parameter' of the client command sheet, and the command ID described in the part is registered in the item 'command ID' of this client command sheet. In the item 'client command notifying destination', reference information to the application program with which the method registered in the 'method name' is to be executed, for example, is registered, this reference information being determined based on correspondence information between a method and an application program, for example, that is provided beforehand. It is noted that the initial value of the 'status' corresponds to 'not processed', and the initial value of the 'output parameter' corresponds to 'NULL'.

After the processes up to step S129 are completed for the subjected part, the same processes starting from step S123 are repeated for a next part if such part exists.

Thus, the process flow illustrated in FIG. 26 ends after the process sequence from step S33 to step S39 is performed on each of the parts contained in the HTTP request received in step S121.

Hereby, the description of the processes pertaining to receiving the HTTP request is completed, and a description of the processes corresponding to steps S116 and onward of FIG. 25 will now be given.

Figure 27:
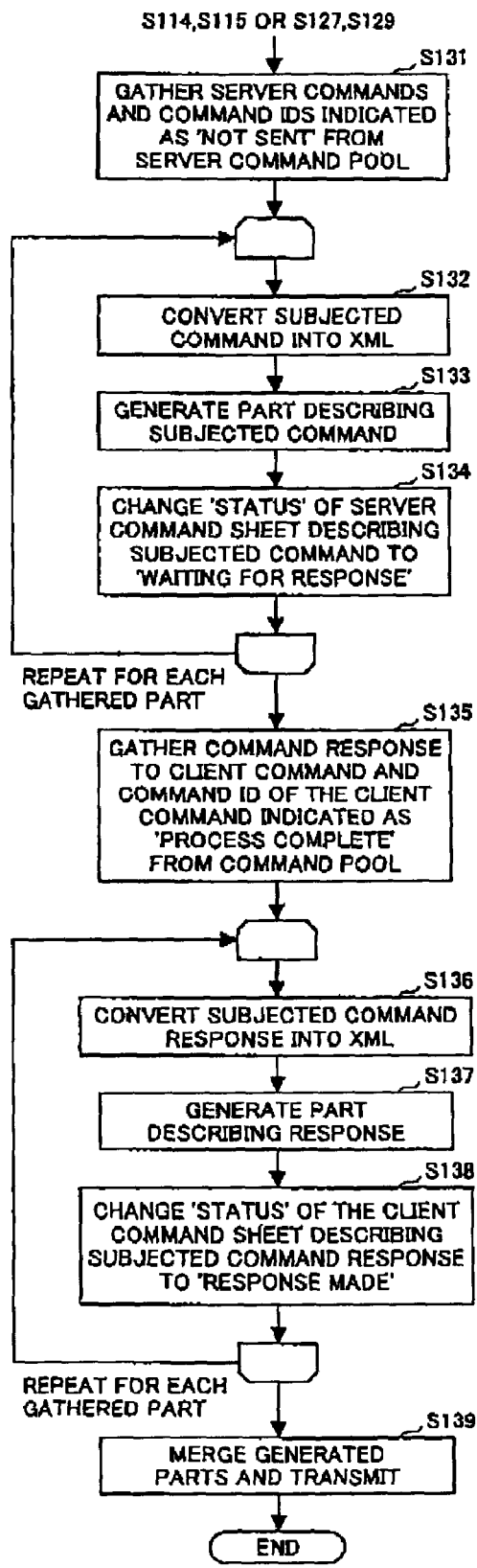
FIG. 27 is a flowchart illustrating a more detailed process flow of steps S116 and onward in FIG. 25.

FIG. 27 is a flowchart illustrating a more detailed process flow of steps S116 and onward of FIG. 25. It is noted that the process step following step S129 of FIG. 26 corresponds to step S131 of this drawing.

According to this process flow, first, the CPU 31 of the HTTP server 12 gathers from the server command pool 141 contents of the 'method name' and 'input parameter' of the server command sheets indicating 'not sent' for the 'status' as server commands to be sent to the HTTP client 11, and also gathers contents of the 'command ID' as IDs of the gathered server commands (S131). It is noted that when 'not sent' is indicated as the 'status', this means that a command generated by the server command generating means 143 has not yet been sent to the HTTP client 11. Thus, commands to be sent to the HTTP client 11 can be extracted based on this information.

Then, a process sequence corresponding to steps S132~S134 is successively performed on each of the server commands gathered in step S131. In this process sequence, first, a server command and its corresponding command ID that are subjected to the process are converted in to an XML text in which information on the client command and the command ID are included in a SOAP body and a SOAP header, respectively (S132). Accessory information is attached to the XML text to generate a SOAP envelope corresponding to a part describing the subjected command (S133). Then, the 'status' of the server command sheet describing the subjected server command is changed from 'not sent' to 'waiting for response' (S134). When the 'status' is indicated as 'waiting for response', this means that the described command has been sent to the HTTP client 11.

After the process sequence is performed on each of the gathered server commands, the CPU 31 gathers the contents of the 'output parameter' of client command sheets of which the 'status' is indicated as 'process complete' as command responses to client commands that are to be transmitted to the HTTP client 11, and also gathers the contents of the 'command ID' as IDs of the client commands corresponding to the gathered responses (S135). When the 'status' is indicated as 'process complete', this means that the response corresponding to the client command that is generated by the client command execution result generating means 144 has not yet been sent to the HTTP client 11. Thus, the command responses to be transmitted to the HTTP client 11 can be extracted based on this information.

Then, a process sequence corresponding to steps S136~S138 is successively performed on each of the command responses gathered in step S135. This process sequence includes converting a subjected command response and the corresponding command ID gathered therewith into an XML text that describes information on this command response and the corresponding command ID in a SOAP body and a SOAP header, respectively (S136), attaching accessory information to the XML text and generating a SOAP envelope corresponding to a part describing the subjected command response (S137). This process sequence is identical to that of steps S132 and S133 except for the difference in the data items being subjected to the processes. Next, the 'status' of the client command sheet describing the subjected command response is changed to 'response made' (S138). When 'response made' is indicated as the 'status', this means that the command response has been sent to the HTTP client 11.

After the completion of the processes described above, the CPU 31 merges the parts generated in steps S133 and S137, generates a multipart HTTP response as shown in FIG. 12, and sends this to the HTTP client 11 (S139).

It is noted that the changing of the 'status' in steps S134 and S138 may be performed after the transmission of data is actually completed.

It is also noted that in the present embodiment, the parts to be transmitted are generated and merged together before they are transmitted, and the parts are received as a whole after which they are divided into parts for further processing; however, the present invention is not limited to this arrangement. For example, the parts may be successively transmitted each time a part is generated, or the parts may be successively received and processed accordingly each time a part is received, as described in the case of the HTTP client 11.

In the following, processes pertaining to the execution of a client command will be described.

Figure 28:
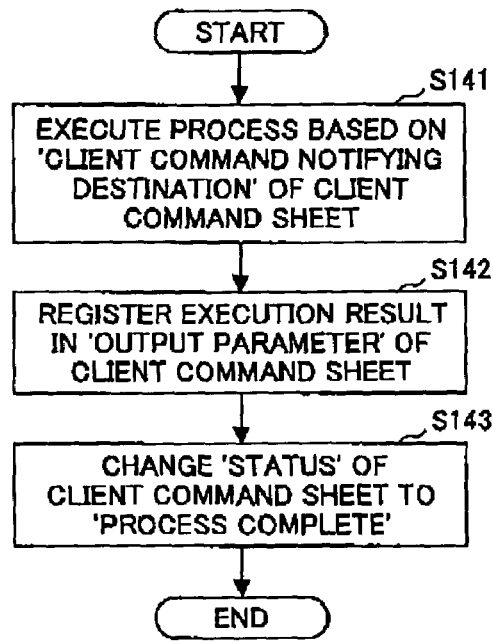
FIG. 28 is a flowchart illustrating an example of a process flow pertaining to the execution of a client command that is performed in the HTTP server shown in FIG. 3.

FIG. 28 is a flowchart illustrating an example of such processes.

This process pertaining to the execution of a server command is performed after step S129 of FIG. 27. Namely, these steps may be performed after the client command is registered in the client command pool 142. The CPU 31 of the HTTP server 12 functions as the client command execution result generating means 144.

In this process flow, first, an application program or some other suitable means for executing the client command is called based on the information corresponding to the 'client command notifying destination' of the client command sheet describing the registered client command, and data corresponding to the 'method name' and 'input parameter' are handed over to the application so that the process pertaining to the server command is performed (S141). Although it is not shown in this flowchart, the process pertaining to the server command is executed by the CPU 31 using a different thread.

After this process step is completed, the execution result is registered in the item 'output parameter' of the client command sheet (S142). At the same time, the 'status' of the client command sheet is changed to 'process complete' which indicates that the process is completed (S143). Then, the operation goes back to the process flow of FIG. 27.

By means of the process steps of FIG. 28, the client command may be executed and appropriate measures may be taken so that the execution result of the client command can be sent to the HTTP client 11 as the command response.

Figure 29:
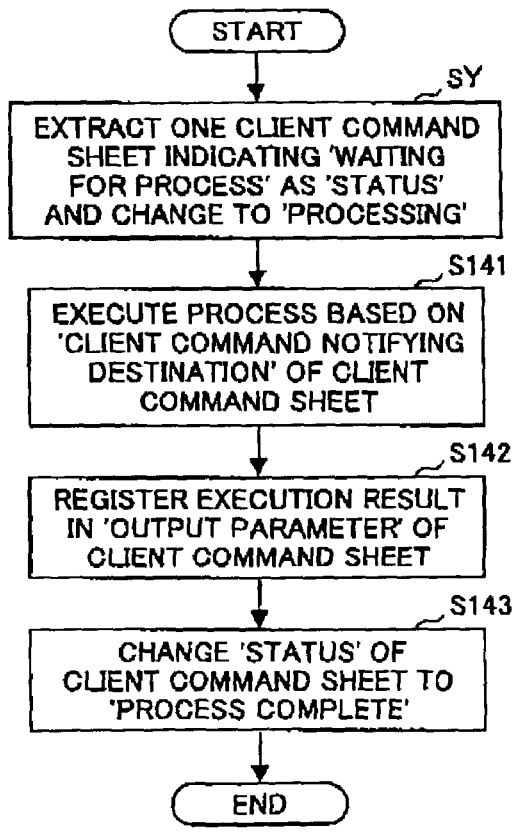
FIG. 29 is a flowchart illustrating another exemplary process flow pertaining to the execution of the client command.

FIG. 29 is a flowchart illustrating another exemplary process flow pertaining to the execution of the client command that is performed independently from the process flow of FIG. 27. The CPU 31 of the HTTP server 12 also functions as the client command execution result generating means 144 as in the example of FIG. 28.

In performing the process steps of FIG. 29, the CPU 31 initiates the process at suitable timings such as at intervals of a predetermined time period or after a predetermined time period passes from the time an HTTP response is received.

When the process of FIG. 29 is started, a client command sheet of which the 'status' is indicated as 'waiting for process' is extracted from the client command pool 142 to be subjected to the subsequent processes, and the 'status' of its command sheet is changed to 'processing' (SY). Although it is not shown, if a client command sheet of which the 'status' is indicated as 'waiting for process' is not found in the client command pool 142, the process of FIG. 29 is ended.

When a client command sheet qualifying for the process can be found, the process steps S141~S143 are performed as in FIG. 28 to execute the client command described in the subjected client command sheet, and the process ends after these steps are completed.

It is noted that the above processes may be performed simultaneously using a plurality of threads as has been described for the HTTP client 11.

By performing the above-described processes, each client command can be executed at a desired timing and, thereby, even when the execution of one command takes a long time, the subsequent processes (client commands) may not necessarily be affected by this delay. The execution results of these client commands are successively adapted for transmission to the HTTP client 11 as command responses in the order in which the execution of each command is completed.

In the above, the processes pertaining to the transfer of commands and command responses performed in the HTTP server 12 has been described.

By implementing the above-described functions in the HTTP client 11 and HTTP server 12 so that they are able to perform the above-described processes, an operation request to be sent from a sender to a communication counterpart, and an operation response to an operation request received from the communication counterpart may be collectively sent to the communication counterpart in one bundle. In this way, it becomes unnecessary to perform individual negotiations to establish connections for the transmission of the operation request and the transmission of the operation response, respectively, and thereby, the communication overhead can be reduced and communication efficiency can be improved.

The collective transmission in a bundle (batch transmission) of the operation request and the operation response is realized by converting each of the operation request and the operation response into serialized data, and further converting each data into a transmission message described in a structured language format. In this way, the operation request and operation response having different formats may be easily merged and they may be transmitted as one logical transmission content.

With this arrangement, the communication apparatus at the receiving side (communication counterpart) is able to receive an operation response to the operation request sent to the communication counterpart and an operation request from the communication counterpart in a batch, and easily divide the received content into individual messages to perform the appropriate processes depending on whether each message corresponds to an operation request or an operation response.

In an embodiment where one communication apparatus is arranged to send a communication request and the communication apparatus at the other end (communication counterpart) is arranged to send messages such as an operation request to the sender of the communication request as a communication response to this communication request, the transmission/reception of operation requests and operation responses may be performed smoothly even in a communication system in which the communication apparatus sending the communication request (communication client) is stationed within a firewall. Also, in this embodiment, since the communication request and communication response correspond to each other, timing management in the communication level may be facilitated.

By arranging the above communication apparatus sending a communication request to periodically send the communication request to its communication counterpart in this embodiment, a delay in the transmission of information from outside to be transmitted inside the firewall for a long period of time can be prevented.

By implementing a client command pool and a server command pool, the operation requests and operation responses generated by various means such as application programs may be accumulated in theses pools and, thus, the operation requests and operation responses may be generated without due consideration to their transmission timing to the communication counterpart. Thereby, the processes performed by the various application programs and/or other suitable means may be simplified and, in turn, the design and development of these application programs may also be simplified.

By implementing gathering means for reading from the pools the operation requests and operation responses that are to be transmitted to the communication counterpart, information to be transmitted can be prevented from being left out in the transmission.

Distributing means may be implemented for dividing the received operation requests and operation responses and storing them in the respective pools. In this way, received information may be accumulated in the pools and, thereby, the execution of an operation pertaining to a received operation request and/or the execution of processes after receiving an operation response may be performed without due consideration to a reception timing from the communication counterpart. Therefore, the processes performed by the various application programs and/or other suitable means may be simplified and, in turn, the design and development of these application programs may also be simplified.

By assigning identification information such as an ID to a generated operation request, and storing or transmitting the operation request in association with this identification information, and also storing or transmitting an operation response in association with the identification information of an operation request for this operation response, correspondence information between an operation request and an operation response may be easily recognized based on the identification information even in a case where a plurality of operation requests and operation responses are included in one message.

By assigning priority information to the operation requests and executing and sending responses for these requests in due order according to the priority information, an operation requiring urgency may be executed with priority and also, a response to this operation request may be sent with priority.

[Reference Example Using SMTP: FIGS. 30~35]

In the following, a reference example in which SMTP is used as the communication protocol will be described It is noted that many common points exist between this reference example and the previously-described embodiment using HTTP as the communication protocol. Thus, parts of the description of this reference example that are identical to those of the embodiment using HTTP are omitted or simplified, and an emphasis is put on features of this reference example that are different from those of the embodiment using HTTP.

Figure 30:
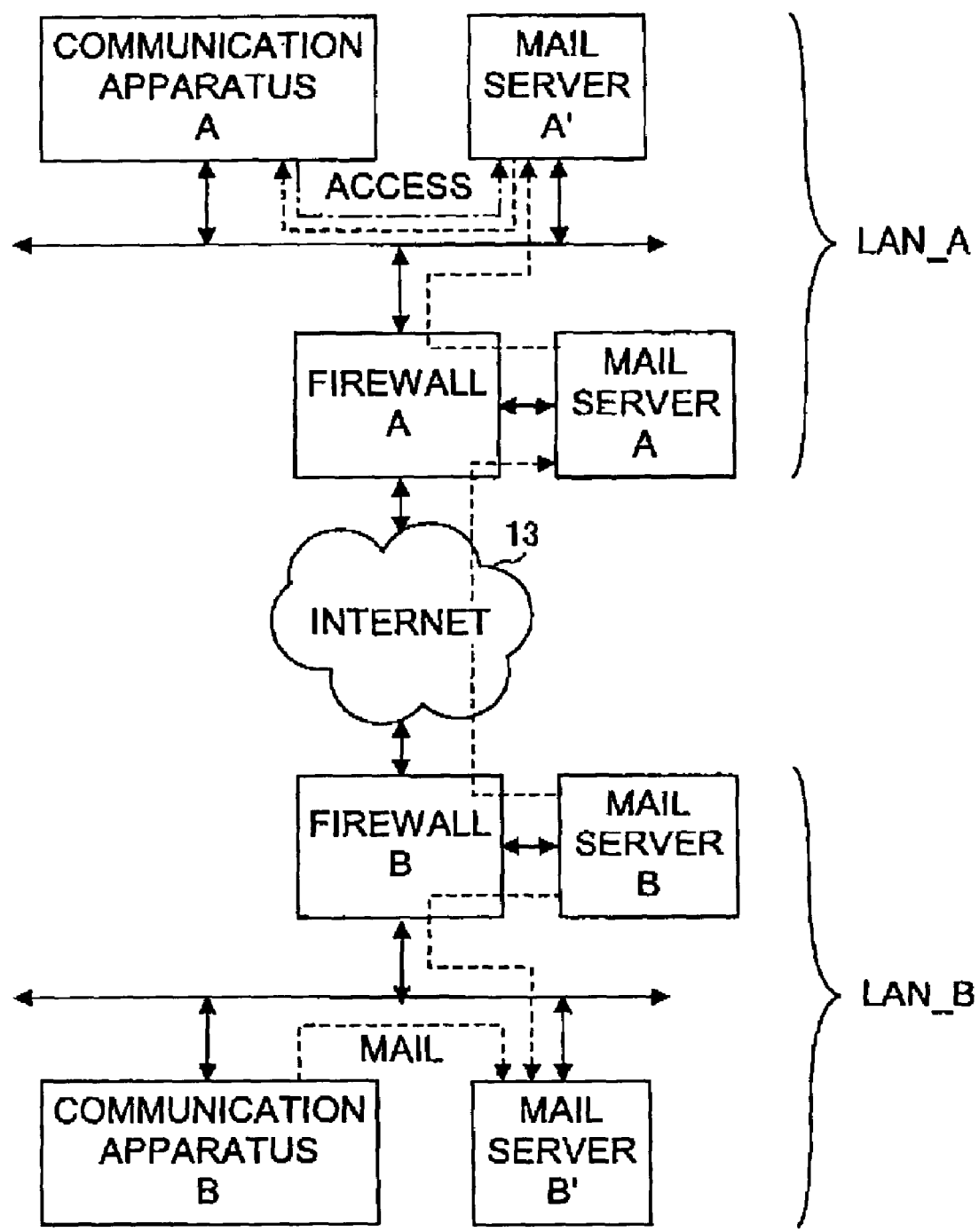
FIG. 30 is a block diagram showing an exemplary configuration of a communication system in a reference example using SMTP as the communication protocol.

FIG. 30 is a block diagram showing an exemplary configuration of a communication system implementing the above reference example using SMTP.

This communication system includes a LAN_A interconnecting a communication apparatus A and a mail server A', a LAN_B interconnecting a communication apparatus B and a mail server B', and Internet 13 interconnecting the LAN_A and LAN_B via a firewall A of the LAN_A and a firewall B of the LAN_B. A mail server A and a mail server B are provided in the LAN_A and LAN_B, respectively, at positions enabling access from outside via the respective firewalls It is noted that the communication apparatus A corresponds to the first communication apparatus, and the communication apparatus B corresponds to the second communication apparatus of FIG. 1.

In a communication using SMTP, the transfer of information between the communication apparatus A and the communication apparatus B is realized by electronic mail. Specifically, for example, when information is to be sent from the communication apparatus B to the communication apparatus A, the communication apparatus B outputs an electronic mail addressed to the communication apparatus A, which is first sent to the mail server B', as is indicated by the dashed line arrows in FIG. 30. Then, the electronic mail is transferred via the mail servers B', B, and A, respectively, before being transferred to the mail server A' to which the communication apparatus A has direct access.

Then, as indicated by the dash-dotted line arrow of FIG. 30, the communication apparatus A can periodically access the mail server A' to receive electronic mail addressed to thereto. In this way, information transmission from the communication apparatus B to the communication apparatus A is completed. On the other hand, in transmitting information from the communication apparatus A to the communication apparatus B, a reverse procedure of the above-described procedure may be performed. In other words, the communication apparatus A and the communication apparatus B operate in a similar manner with respect to information transmission. It is noted that the mail server A' and mail server B' do not necessarily have to be implemented, and the communication apparatus A may communicate directly with the mail server A and the communication apparatus B may communicate directly with the mail server B.

In such a system, each LAN implements a mail server at a position that allows access from outside so that electronic mail can be sent thereto via the firewall.

In this reference example, the communication apparatus A and the communication apparatus B are able to transmit information to/from each other even though they do not communicate through direct negotiation. Thus, it is presumed that such information transmission corresponds to a 'communication' and will be referred to as such hereinafter.

As with the first and second communication apparatuses of FIG. 1, the communication apparatus A and communication apparatus B implement application programs for controlling and managing each other. Using RPC, each communication apparatus is arranged to send an 'operation request' calling for the execution of the process for a method of an application program implemented at the other side, and acquire an 'operation response' corresponding to the execution result of the requested process.

Figure 31A:
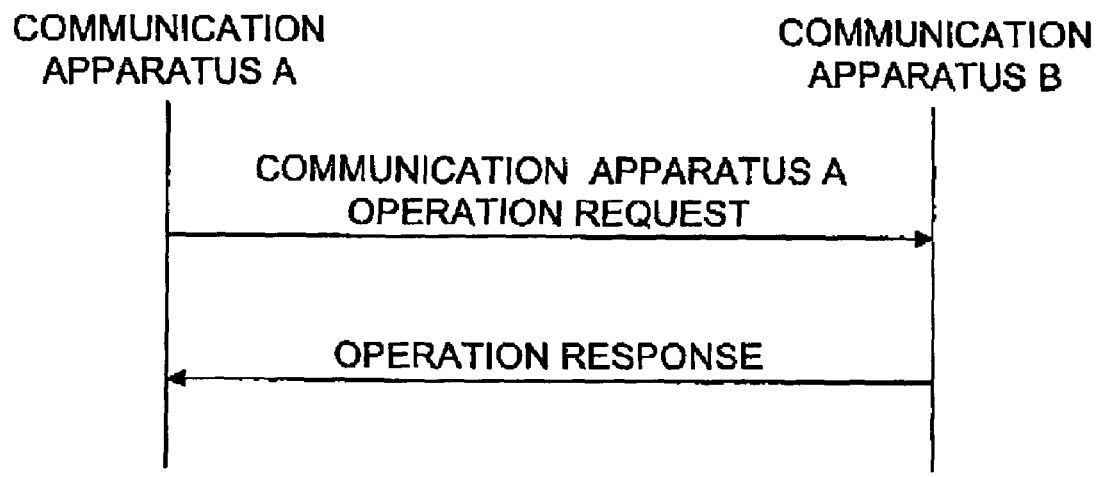
FIGS. 31A and 31B illustrate a relation between an operation request and an operation response in the communication system of FIG. 30.
Figure 31B:
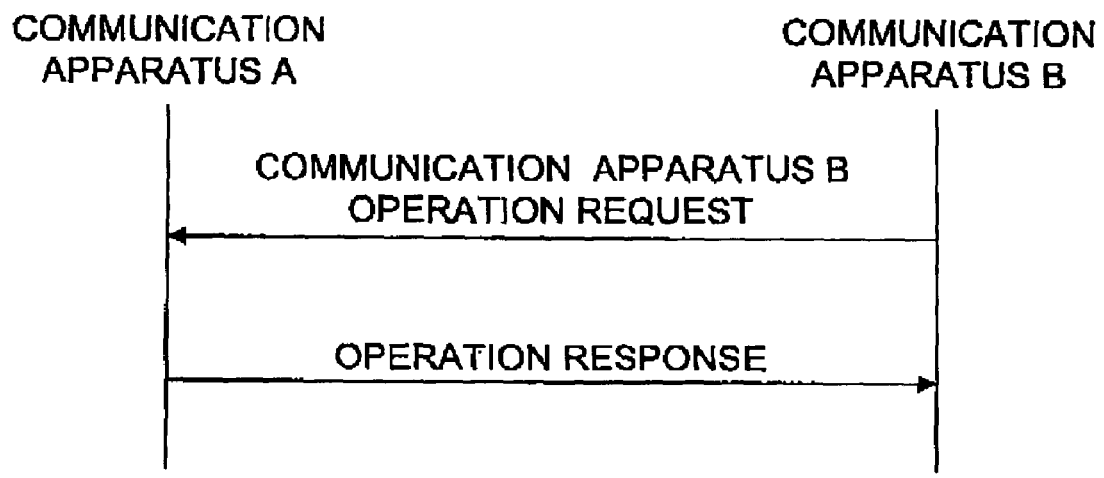

FIGS. 31A and 31B show relations between the operation request and the operation response. As is shown, in the operation request level, the communication apparatus A and the communication apparatus B operate in a similar manner as with the HTTP client 11 and the HTTP server 12.

Further, in the case of using SMTP, the communication apparatus A and the communication apparatus B operate in a similar manner even in the communication level, this being different from the relation between the HTTP client 11 and the HTTP server 12.

Figure 32:
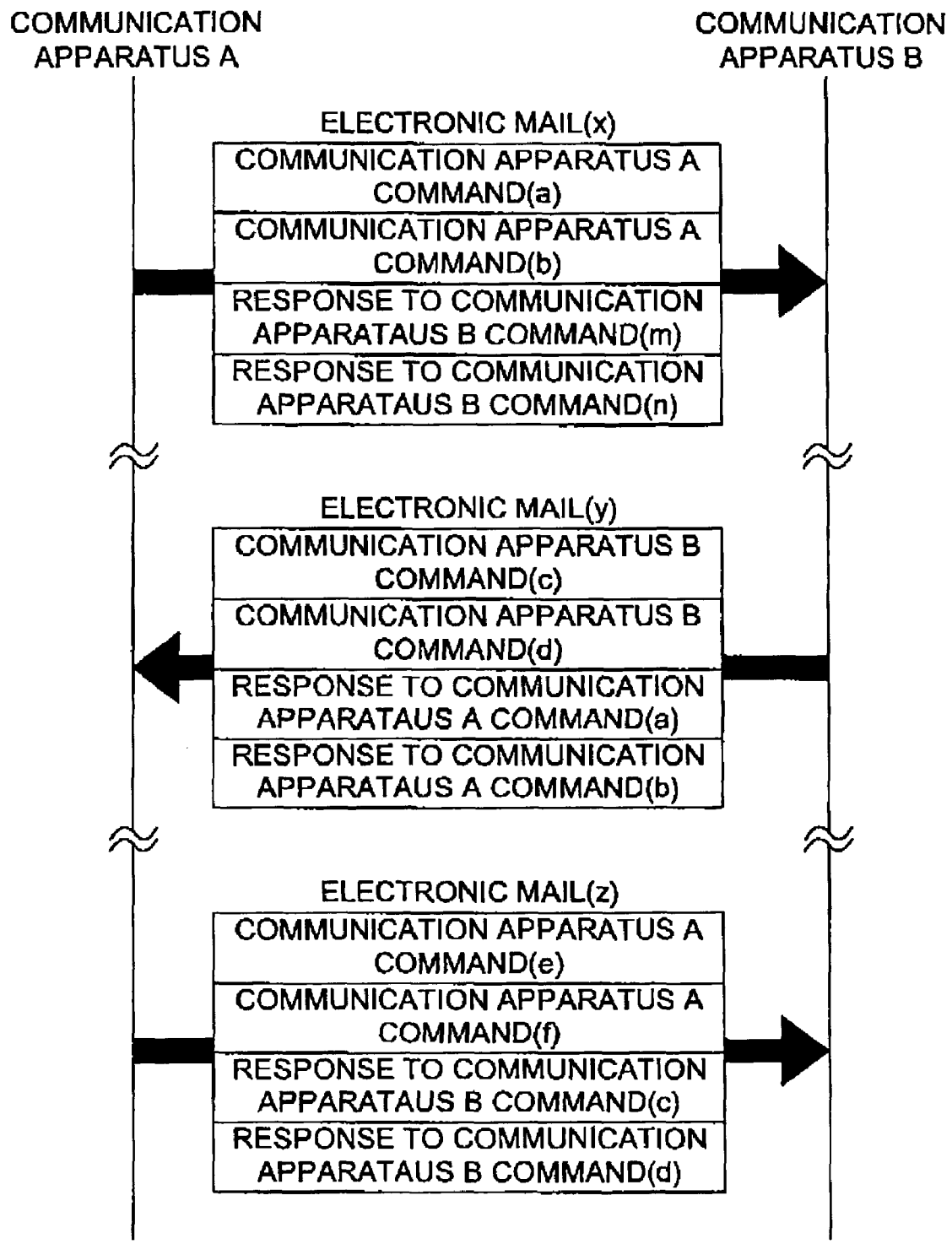
FIG. 32 shows an exemplary communication sequence in the communication system of FIG. 30.

FIG. 32 shows an exemplary communication sequence in this communication system.

As described earlier, in this communication system, communication between the communication apparatus A and the communication apparatus B is performed using electronic mail. This electronic mail includes information on a sender and a destination, and a reply may be sent back to the sender from the destination. However, in this case, the first mail and the reply mail are independent from each other; that is, in this example there is no relation similar to the communication request-communication response relation found in the embodiment using HTTP.

Thus, either of the two communication apparatuses is able to initiate the communication, and the electronic mail does not necessarily have to be sent back and forth. In the following example, a case will be described in which a total of three electronic mails are transmitted/received back and forth starting with the communication apparatus A sending an electronic mail to the communication apparatus B.

In these electronic mails, an operation request (command) to a destination and an operation response (command response or simply 'response') to the command received from the destination are described. This case applies whether the sender corresponds to the communication apparatus A or the communication apparatus B.

Thus, for example, communication apparatus A command (a) may be described in electronic mail (x) to be transmitted to the communication apparatus B, and subsequently, the corresponding command response from the communication apparatus B may be described in electronic mail (y) to be sent to the communication apparatus A. Also, communication apparatus B command (c) may be described in the electronic mail (y) and, subsequently, the corresponding command response from the communication apparatus A may be described in electronic mail (z) to be sent to the communication apparatus B.

It is noted that any number (including 0) of operation requests and operation responses to the operation request may be described in one electronic mail. Further, the content described in one electronic mail corresponds to one message and is logically sent as one batch. In this way, the number of electronic mails for transmitting information can be reduced so that the communication overhead is reduced and communication efficiency is improved.

It is also noted that a command response may be described in a first electronic mail sent after the reception of the corresponding command or in an electronic mail sent thereafter as in the example of FIG. 6 using HTTP.

Next, in the following, functional configurations and process steps for realizing the processes of merging the commands and command responses and separating these parts in the communication apparatus A and communication apparatus B will be described. It is noted that the hardware configurations of these apparatuses may be identical to the configuration illustrated in FIG. 7 for the HTTP client 11 and HTTP server 12.

Figure 33:
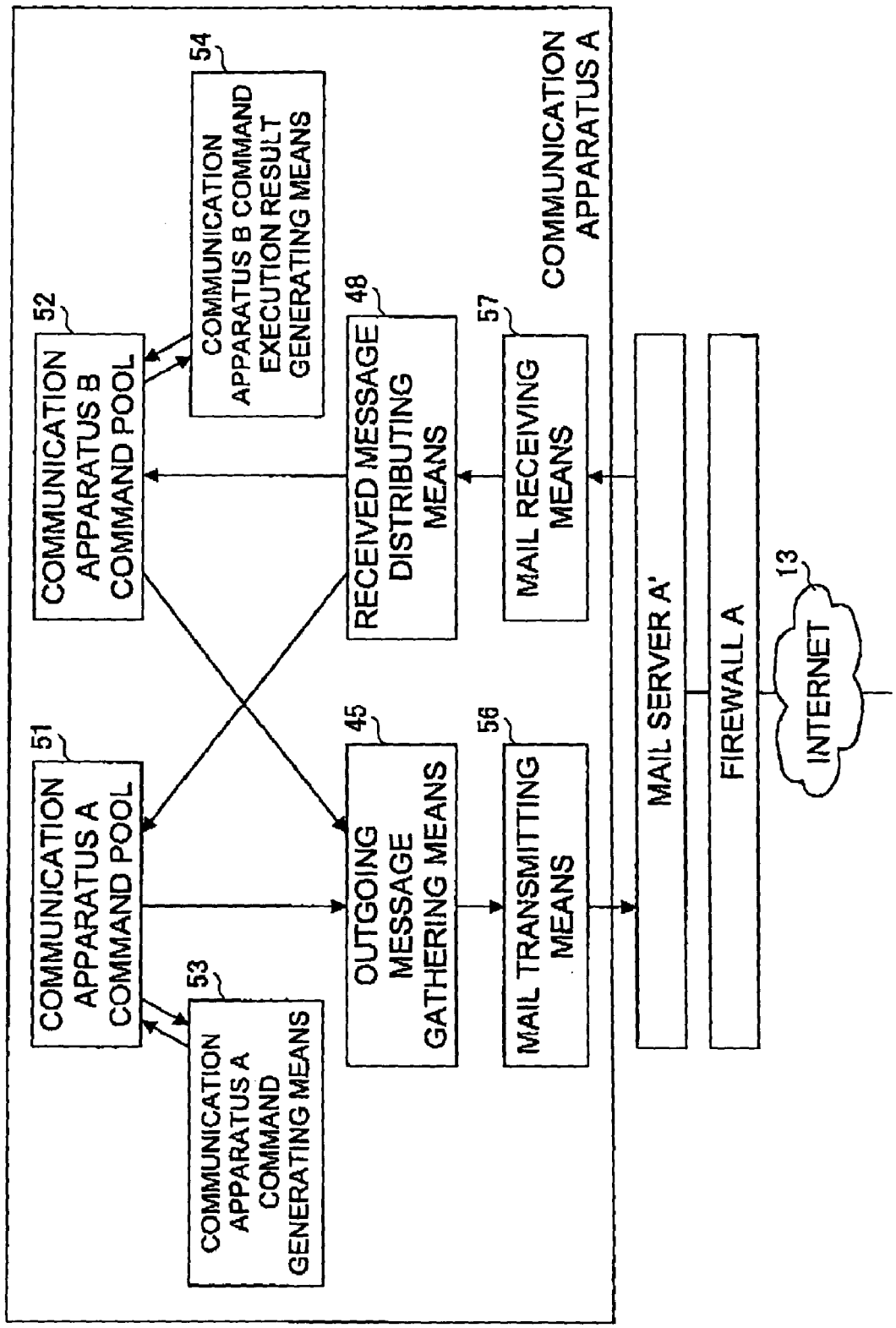
FIG. 33 is a block diagram illustrating a functional configuration of a communication apparatus shown in FIG. 30 for performing the processes pertaining to a command and a command response.

FIG. 33 is a functional block diagram illustrating a functional configuration of the communication apparatus A for performing the processes pertaining to the commands and command responses (corresponding to FIG. 8).

As is shown, the communication apparatus A includes a communication apparatus A command pool 51, a communication apparatus B command pool 52, communication apparatus A command generating means 53, and communication apparatus B command execution result generating means 54, which correspond to the client command pool 41, the server command pool 42, the client command generating means 43, and the server command execution result generating means 44, respectively (see FIG. 8). The differences in the names of these corresponding functions are due to the differences in the names of the apparatuses.

The communication apparatus A includes outgoing message gathering means 45 and received message distribution means 48 as in FIG. 8. It is noted that in this example, a data format corresponding to SMTP is used for transmission and reception of data. However, the individual SOAP messages corresponding to the commands and command responses described are identical to those used in the embodiment of FIG. 8.

The communication apparatus A further includes mail transmitting means 56 and mail receiving means 57, which respectively correspond to transmitting means and receiving means, are different from the HTTP request transmitting means 46 and the HTTP response receiving means 47 since the protocol being used for transmission and reception of data in the two examples is different.

The mail transmitting means 56 has the function of generating an electronic mail addressed to the communication apparatus B that includes the outgoing message generated by the outgoing message gathering means 45, and sending this to the mail server A'. After this, the communication apparatus A does not interfere with the transmission of this electronic mail. As in the embodiment of FIG. 8, any number of outgoing messages may be included in one electronic mail, and the outgoing message may correspond to a command response or a communication apparatus A command. The outgoing messages corresponding to a command response and outgoing messages corresponding to a communication apparatus A command may be intermingled on an arbitrary basis.

The mail receiving means 57 has the function of checking to see whether there are any newly arrived mails, and receiving the newly arrived mails if they exist. The electronic mail to be received may include any number of receiving messages describing a communication apparatus B command and its associated command ID, and receiving messages describing a response to a communication apparatus A command and its associated command ID, that are intermingled with each other on an arbitrary basis.

FIG. 34 shows an exemplary electronic mail to be sent to the communication apparatus B from the communication apparatus A having the above-described functions.

This electronic mail, like the HTTP request of FIG. 11, has a body portion that describes a multipart message using MIME (Multipurpose Internet Mail Extension). In each part making up the multipart message a SOAP envelope is embedded. Thus, the body portion of this electronic mail is identical to the HTTP body of the HTTP request.

However, the header portion of this electronic mail is different from the HTTP header in that information corresponding to items 'From' for indicating the sender address of the electronic mail, 'To' for indicating the destination address, and 'Subject' for indicating the title, for example, are described therein.

As for the electronic mail to be sent to the communication apparatus A from the communication apparatus B, the information content described in the item 'From' and 'To' are exchanged.

Also, the contents of the SOAP envelopes described in the electronic mails are identical to those described in the HTTP request or HTTP response. However, in the entity header portion of each part, different information may be described since the data encoding method used in this example is different from that used in the embodiment using HTTP.

In the following, processes executed in the communication apparatus A having the above-described configurations and functions will be described with reference to flowcharts shown in FIGS. 35 and 36. It is noted that the processes shown in these flowcharts are executed by a CPU that is implemented in the communication apparatus A and executes suitable control programs.

Figure 35:
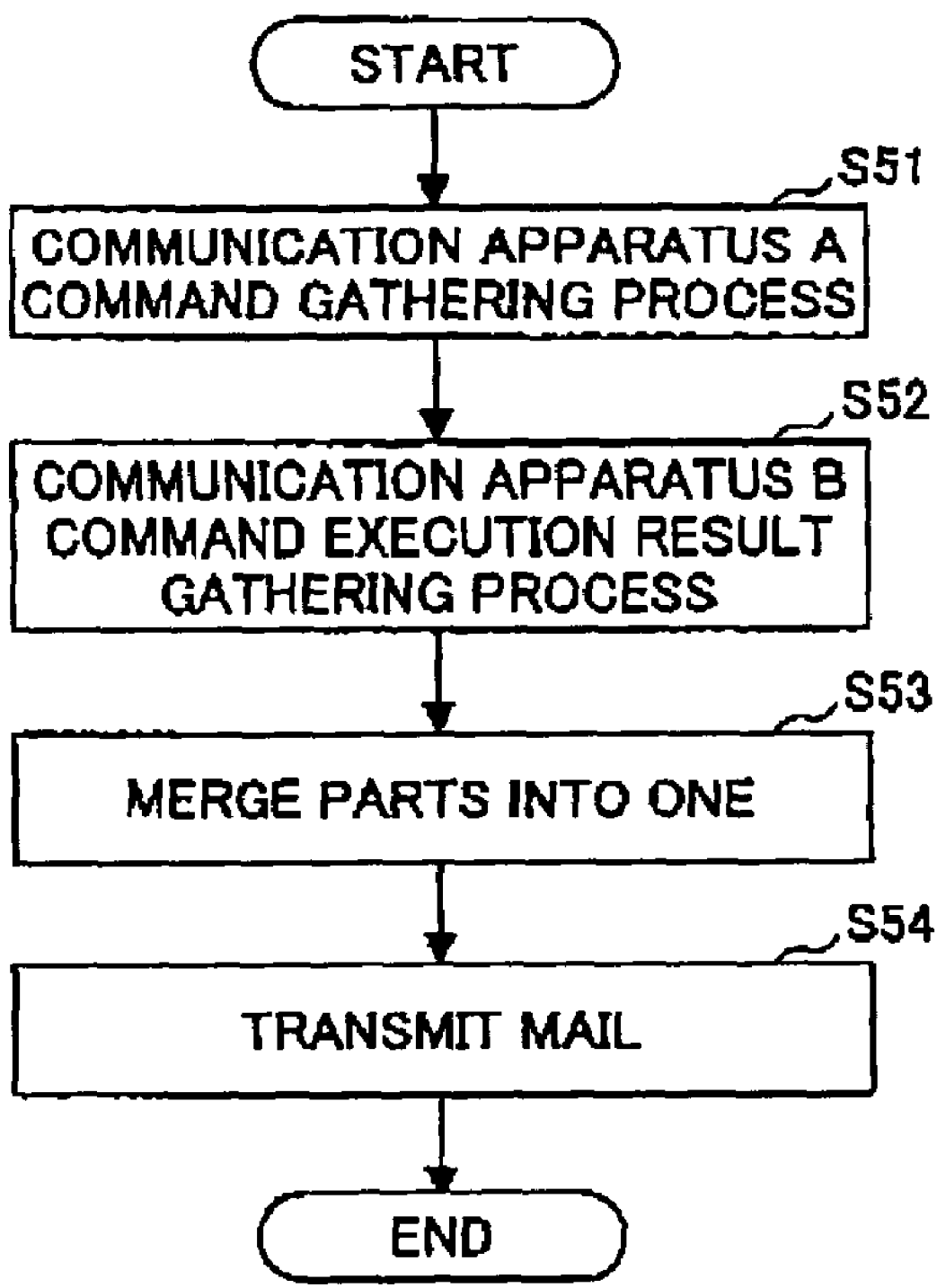
FIG. 35 is a flowchart illustrating a basic operation flow for message transmission in the communication system of FIG. 30.

FIG. 35 is a flowchart illustrating a basic operation flow of processes executed upon message transmission.

First, the CPU of the communication apparatus A starts the process flow of FIG. 35 at an appropriate timing for the outgoing message gathering means 45 to undertake a readout of communication apparatus A commands and/or command responses.

Then, a communication apparatus A command gathering process is performed (S51). This corresponds to a process of gathering from the communication apparatus A command pool 51 communication apparatus A commands to be sent to the communication apparatus B, and also includes a process of generating SOAP envelope parts based on the gathered data.

Then, a communication apparatus B command execution result gathering process is performed (S52). This corresponds to a process of gathering from the communication apparatus B command pool 52 command responses to be sent to the communication apparatus B, and also included a process of generating SOAP envelope parts based on the gathered data.

Then, the parts generated in the processes of steps S51 and S52 are merged so that an electronic mail containing these parts is generated (S53). This electronic mail is then addressed to the communication apparatus B and sent thereto (S54) and, hereby, the message transmission process of FIG. 35 is completed.

In executing the above-described processes, the CPU of the communication apparatus A functions as the outgoing message gathering means 45 in steps S51 and S52, and as the mail transmitting means 56 in steps S53 and S54.

It is noted that these processes correspond to steps S11~S14 of FIG. 17. However, in the case of using SMTP, the transmission of electronic mail and the reception of electronic mail each correspond to individual processes and a relation such as that between the communication request and the communication response in the data transmission/reception between the HTTP client 11 and HTTP server 11 does not exist in this example. Thus, the transmission process ends here, and another separate process is performed in receiving the electronic mail.

Figure 36:
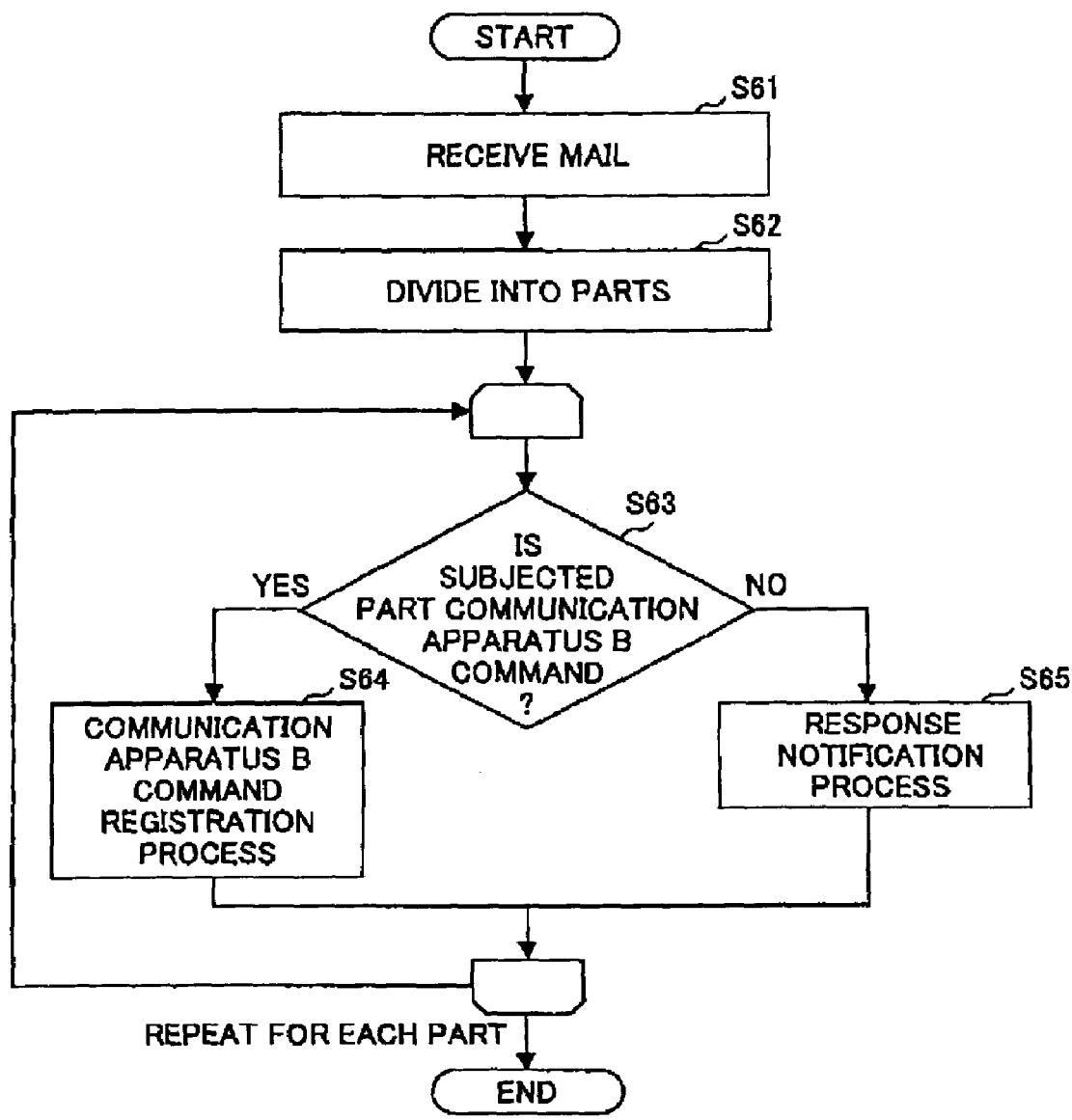
FIG. 36 is a flowchart illustrating a basic operation flow for message reception in the communication sytem of FIG. 30.

FIG. 36 is a flowchart illustrating a basic operation flow of a message receiving process.

The CPU of the communication apparatus A periodically accesses the mail server A' and starts the process illustrated in the flowchart of FIG. 36 when it detects a newly arrived electronic mail addressed to the communication apparatus A.

In this process, first, the CPU receives the newly arrived electronic mail (S61). Then, the body (text) of the received electronic mail is divided into parts (S62). This corresponds to a process of dividing the body into components that are separated from each other by a 'MIME_boundary'.

Then, a sequence of processes corresponding to steps S63~S65 is successively performed for each of the divided parts. In this process sequence, first, it is determined whether a part subjected to the process describes a communication apparatus B command (S63). Then, if it is determined that the part describes a communication apparatus B command, a communication apparatus B command registration process is performed (S64). On the other hand, if it is determined that the part does not describe a communication apparatus B command, this means that the part describes a response to a communication apparatus A command and, thereby, a response notification process is performed (S65).

After performing either step S64 or S65, the process goes back to step S63, and the process sequence is repeated for a next part that is subjected to the process. Thus, the process sequence of steps S63~S65 is performed for each of the divided parts, after which the message receiving process of FIG. 36 ends.

In executing the above-described processes, the CPU of the communication apparatus A functions as the mail receiving means 57 in step S61, and as the received message distribution means 48 in steps S62~S65.

These processes correspond to steps S15~S19 of FIG. 17.

It is also noted that the processes relating to the execution of a communication apparatus B command in the communication apparatus A are identical to the processes relating to the execution of the server command described with reference to FIGS. 20 and 21.

In the above, the processes relating to the transmission of a command and a command response performed in the communication apparatus A have been described.

As for the functions and processes of the communication apparatus B, the concepts of the communication apparatus A command and the communication apparatus B command may be switched in the above descriptions of the communication apparatus A.

As described above, the present invention may be applied to communications performed using a protocol that does not necessarily correspond the transmission of information to a response to this transmission. Even in such case, an operation request to be sent from a sender to a communication counterpart, and an operation response to a operation request that has been received from the communication counterpart may be collectively sent to the communication counterpart in one batch so that the operation request and the operation response do not have to be transmitted in separate units. In this way, the communication overhead can be reduced and communication efficiency can be improved.

Also, by using electronic mail for data transmission and reception, information can be easily transferred within the firewalls.

Figure 37:
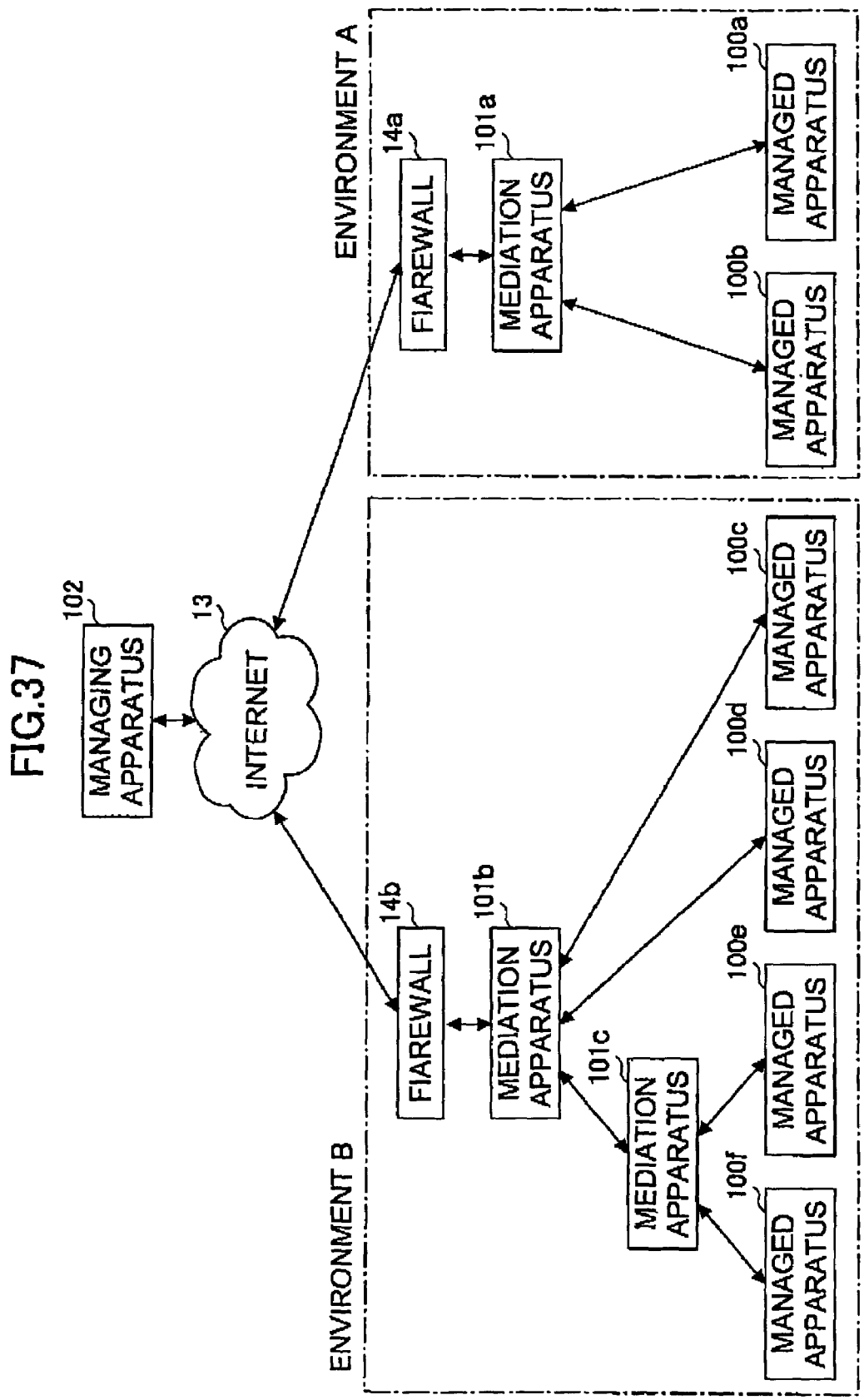
FIG. 37 illustrates another exemplary communication system according to an embodiment of the present invention.

[Modification of Embodiment and Reference Example: FIG. 37]

In the following, an exemplary modification of the above-described embodiment and reference example will be described.

In the above described embodiment and reference example, the present invention is described by illustrating an exemplary communication system that is made up of two communication apparatuses; however, this has been done to simplify the description and the present invention is not limited to these examples. For example, the present invention may be applicable to a communication system made up of a greater number of communication apparatuses or a communication apparatus included in such communication system.

FIG. 37 illustrates another exemplary communication system that uses HTTP as the communication protocol.

This communication system corresponds to a remote management system for managing a managed apparatus by means of a managing apparatus by establishing a connection between the apparatuses via a network such as the Internet. As is shown in the drawing, this system includes a managing apparatus 102 that corresponds to a communication apparatus having communication functions, managed apparatuses 100a~f that also correspond to communication apparatuses having communication functions (collectively referred to as 'managed apparatus 100' hereinafter), and the Internet 13 that establishes a connection between the managing apparatus 102 and the managed apparatus 100.

The managed apparatus 100 may correspond to various types of electronic apparatuses having communication functions including, for example, a printer, a scanner, a copier, a digital multi functional imaging apparatus implementing more than one of the above functions, a network appliance, a vending machine, medical equipment, a power source apparatus, an air conditioning system, measuring systems for gas, water, or electricity, a computer that can be connected to a network.

This remote management system includes mediation apparatuses 101a~c that correspond to communication apparatuses that mediate the communication between the managing apparatus 102 and the managed apparatus 100 (collectively referred to as mediation apparatus 101' hereinafter). Thus, the managing apparatus 102 and the managed apparatus 100 communicate with each other via the mediation apparatus 101.

The mediation apparatus 101 and the managed apparatus 100 may be arranged in various configurational structures according to their usage environment. For example, in environment A shown in FIG. 37, the managed apparatuses 100a and 100b, and the mediation apparatus 101a that is capable of establishing a connection with the managing apparatus 102 using HTTP are arranged in a simple configurational structure in which the mediation apparatus 101a subordinates the managed apparatuses 100a and 100b. On the other hand, in environment B, four managed apparatuses 100c, 100d, 100e, and 100f are provided and, thereby, the load may be too large for one mediation apparatus to subordinate the managed apparatuses.

For this reason, in an embodiment, the mediation apparatuses 101b and 101c may be provided. In the configurational structure of environment B, the mediation apparatus 101b that is capable of establishing connection with the managing apparatus 102 using HTTP subordinates not only the managed apparatuses 100c and 100d but also the other mediation apparatus 101c. Further, the mediation apparatus 101c subordinates the managed apparatuses 100e and 100f. Information generated from the managing apparatus 102 to conduct remote management on the managed apparatuses 100e and 100f passes through the mediation apparatus 101b, and then the mediation apparatus 101c, which corresponds to a subordinate node of the mediation apparatus 101b, to reach the managed apparatus 100e or 100f. Also, for security reasons, fire walls 14a and 14b (collectively referred to as 'firewall 14' hereinafter) are implemented in the environments A and B, respectively.

By handling the mediation apparatus 101 as the HTTP client and the managing apparatus 102 as the HTTP server, the present invention may be applied to this remote management system.

In such case, when the managing apparatus 102 is to send a command to the managed apparatus 100, the managing apparatus 102 may first send a command 'send command to managed apparatus 100', and the mediation apparatus 101 may be arranged to send the command to the managed apparatus 100 as an operation corresponding to the command received from the managing apparatus 102. Alternatively, the managing apparatus 102 may designate one of the managed apparatuses 100a~f as a destination of a command and then send this command to the mediation apparatus 101, and the mediation apparatus 101 may be arranged to send a command received from the managing apparatus 102 that is addressed to a destination other than itself to the designated destination.

When transmission/reception of commands and command responses is performed between three or more nodes, information on the sender and destination of the command may be included in a message corresponding to the command or command response so that the sender and destination of the command can be determined, and preferably, this information is described and managed in a command sheet as well.

By implementing a mail server in this system, the reference example using SMTP may also be applied to this system.

The present invention is not limited to these embodiments, and further variations and modifications may be made without departing from the scope of the present invention For example, the client command sheet and server command sheet respectively registered in the client command pool 41 and the server command pool 42 may be described as XML formatted documents.

A limit may be imposed on the amount of information contained in the command response to be transmitted/received.

In the above described embodiment and reference example, SOAP is used as the superordinate protocol for realizing RPC; however, other protocols such as CORBA (common object request broker architecture) or JAVA (Registered Trademark) RMI (remote method invocation) may be used as well.

In other words, according to the above embodiment and reference example, the exchange of a command and a response to this command between the HTTP client 11 and the HTTP server 12 is realized by a SOAP message described in XML; however, the present invention is not limited to this arrangement and data may be described In other formats as well.

In the present embodiment, unique protocols are used in addition to protocols according to the SOAP standard so that the SOAP envelopes included in the HTTP request or HTTP response can be handled as independent parts. Using the SOAP attachment covered by the SOAP standard protocol, the SOAP envelope corresponding to the first part of the HTTP response may be arranged to contain links to subsequent SOAP envelopes corresponding to the second part and onward so that they are associated when handed down. This arrangement can similarly be applied to the reference example using electronic mail and SMTP.

In the present embodiment, HTTP is used for data transmission as the subordinate protocol with respect to the superordinate protocol such as SOAP, and in the reference example, SMTP (simple mail transfer protocol) Is used. However, other protocols such as FTP (file transfer protocol) may also be used as the subordinate protocol.

The configuration of the communication system according to the present invention is not limited to the preferred embodiments and examples described in the present application.

The programs stored in the medium according to the present invention correspond to application programs for administering a computer to function as a communication apparatus such as the HTTP client 11, the HTTP server 12, the communication apparatus A or B that is capable of communicating with another communication apparatus as a communication counterpart, and by executing such programs in a computer, the various effects described above can be obtained.

Such programs may be stored in advance in storage means provided in the computer such as a ROM or an HDD. Alternatively, the programs may be recorded on a recording medium such as a CD-ROM, or a nonvolatile recording medium (memory) such as a flexible disk, a SRAM, an EEPROM, or a memory card. In this case, the programs recorded on the memory may be installed in the computer so that the CPU can execute the programs, or the CPU may be arranged to read the programs as well as executing them. In this way, the various processes described above may be realized.

As another alternative, the programs may be downloaded from an external apparatus that is connected to a network and has a recording medium on which the program is recorded, or stores the programs in its storage means, so that the programs are executed by the CPU.

The present application is based on and claims the benefit of the earlier filing date of Japanese Patent Application No.2002-272978 filed on Sep. 19, 2002, Japanese Patent Application No.2002-272978 filed on Sep. 24, 2002, and Japanese Patent Application No.2003-305506, Japanese Patent Application No.2003-305517, Japanese Patent Application No.2003-305511, Japanese Patent Application No.2003-305513, and Japanese Patent Application No.2003-305514, filed on Aug. 28, 2003, the entire contents of which are hereby incorporated by reference.

What is claimed is:

1. A communication apparatus adapted to communicate with a second communication apparatus as a communication counterpart, the communication apparatus comprising:
   a first storage unit configured to store a first operation request from the second communication apparatus for requesting the communication apparatus to perform a predetermined operation and a first operation response to the first operation request;
   a second storage unit configured to store a second operation request for requesting the second communication apparatus to perform a predetermined operation;
   a status storage unit configured to store status information indicating which of not-processed status, presently-processing status and processed status as a current status of the first and second operation requests;
   an acquisition unit configured to acquire the first operation response associated with the first operation request from the first storage unit when a current status of the first operation response corresponds to a processed status in the status storage unit, and to acquire the second operation request from the second storage unit when a current status of the second operation request corresponds to a not-processed status in the status storage unit; and
   a transmission unit configured to transmit a communication request to the second communication apparatus, the communication request including the first operation response and the second operation request acquired by the acquisition unit.

2. The communication apparatus as claimed in claim 1, further comprising:
   a request processing unit configured to search the first storage unit for the first operation request, the current status of the first operation request corresponding to the not-processed status, cause a module corresponding to an operation associated with the first operation request to perform the operation associated with the first operation request and modify the current status of the first operation request to the presently-processing status.

3. The communication apparatus claimed in claim 2, wherein a plurality of the request processing units perform respective operations in multiple threads concurrently.

4. The communication apparatus as claimed in claim 1, wherein:
   the first operation request and the second operation request each correspond to a function call; and
   the first operation response and a second operation response to the second operation request each correspond to an execution result of a function called by the function call.

5. The communication apparatus as claimed in claim 1, wherein:
   the transmission unit is configured to transmit to the communication counterpart the second operation request and the first operation response as SOAP messages, and receive from the communication counterpart the first operation request and a second operation response to the second operation request as SOAP messages.

6. The communication apparatus as claimed in claim 1, further comprising:

an assigning unit configured to assign priority information to the first operation request stored in the first storage unit and the second operation request stored in the second storage unit, wherein the acquisition unit is configured to successively read from the first storage unit the first operation request from the communication counterpart, generate a first operation response to said first operation request, and store the generated first operation response in the first storage unit according to the priority information, and the acquisition unit is configured to successively read from the first storage unit the first operation response to the first operation request from the communication counterpart according to the priority information, and successively read from the second storage unit the second operation request to the communication counterpart according to the priority information.

* * * * *